(12) United States Patent
Miyamoto

(10) Patent No.: US 10,789,203 B2
(45) Date of Patent: Sep. 29, 2020

(54) DATA PROCESSING APPARATUS, DATA PROCESSING METHOD, AND PROGRAM RECORDING MEDIUM

(71) Applicant: NEC Corporation, Minato-ku, Tokyo (JP)

(72) Inventor: Takamichi Miyamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 70 days.

(21) Appl. No.: 16/091,634

(22) PCT Filed: May 22, 2017

(86) PCT No.: PCT/JP2017/018978
§ 371 (c)(1),
(2) Date: Oct. 5, 2018

(87) PCT Pub. No.: WO2017/204139
PCT Pub. Date: Nov. 30, 2017

(65) Prior Publication Data
US 2019/0138495 A1    May 9, 2019

(30) Foreign Application Priority Data

May 23, 2016  (JP) ................. 2016-102285

(51) Int. Cl.
G06F 15/82 (2006.01)
G06F 9/30 (2018.01)

(52) U.S. Cl.
CPC ........ G06F 15/825 (2013.01); G06F 9/30007 (2013.01)

(58) Field of Classification Search
None
See application file for complete search history.

(56) References Cited

U.S. PATENT DOCUMENTS 5,940,619 A * 8/1999 Abadi ..................... G06F 8/311
717/139
6,205,491 B1 * 3/2001 Callsen ................... G06F 9/465
719/315

(Continued)

FOREIGN PATENT DOCUMENTS

JP    2004258905 A    9/2004
JP    2011039857 A    2/2011

(Continued)

OTHER PUBLICATIONS

Matsuo, "Reducing Communication for Efficient Data Reuse in the Grid", 2006, Information Processing Society of Japan, SIG Technical Report (Year: 2006).*

(Continued)

Primary Examiner — Hossain M Morshed

(57) ABSTRACT

A process set selection unit generates, based on a process set comprising a processing block performing arithmetic on a group of inputs and a group of outputs produced by the processing block, a group of new inputs having a combination number less than that of the group of inputs and a new processing block for the group of new inputs. A reuse execution unit prepares, based on the new processing block for performing arithmetic on the group of new inputs and a group of outputs produced by the new processing block, an associated result which associates the group of new inputs with the group of outputs, produces the group of outputs obtained from the association result if the group of new inputs have values equal to those of the group of inputs, and, if not, executes the new processing blocks to register an executed result to the associated result.

13 Claims, 28 Drawing Sheets

(56) References Cited

U.S. PATENT DOCUMENTS

| | | | | |
|---|---|---|---|---|
| 7,086,066 | B2* | 8/2006 | Kappel | G06F 9/4812 |
| | | | | 714/38.14 |
| 7,310,723 | B1* | 12/2007 | Rozas | G06F 9/30076 |
| | | | | 712/218 |
| 2008/0059676 | A1* | 3/2008 | Archer | G06F 13/24 |
| | | | | 710/260 |
| 2011/0302371 | A1* | 12/2011 | Lysko | G06F 12/08 |
| | | | | 711/118 |
| 2012/0185859 | A1* | 7/2012 | Kashiwaya | G06F 9/3808 |
| | | | | 718/100 |
| 2012/0268471 | A1* | 10/2012 | Khalvati | G06T 1/60 |
| | | | | 345/522 |
| 2013/0073523 | A1* | 3/2013 | Gounares | G06F 16/285 |
| | | | | 707/690 |
| 2013/0298108 | A1* | 11/2013 | Oliver | G06F 8/315 |
| | | | | 717/116 |
| 2015/0347139 | A1* | 12/2015 | Keramidas | G06F 12/0862 |
| | | | | 712/234 |
| 2016/0154654 | A1* | 6/2016 | Williams | G06F 9/3861 |
| | | | | 712/244 |
| 2019/0138495 | A1* | 5/2019 | Miyamoto | G06F 9/3832 |

FOREIGN PATENT DOCUMENTS

| | | |
|---|---|---|
| JP | 2011039859 A | 2/2011 |
| JP | 201196153 A | 5/2011 |

OTHER PUBLICATIONS

International Search Report, dated Aug. 22, 2017 from the International Bureau in counterpart International application No. PCT/JP2017/018978.

Kato, H., et al., "A Program Transaction Method for Utilizing an Auto-Memoization Processor" IPSJ SIG Technical Report, 2009, vol. 2009-ARC-184, No. 7, pp. 1-8.

Suzuki, I., et al., "An Evaluation of Reuse with Genetic Algorithms", Symposium on Advanced Computing Systems and Infrastructures SACSIS2005, 2005, pp. 133-141.

Matsuo, K., et al., "Reducing Communication for Efficient Data Reuse in the Grid", IPSJ SIG Notes, 2006, vol. 2006, No. 87, pp. 19-24.

* cited by examiner

| INPUT 1 | INPUT 2 | INPUT 3 | OUTPUT |
|---------|---------|---------|--------|
| 0 | 0 | 0x0010 | 10 |
| 0 | 1 | 0x0010 | 20 |
| 1 | 0 | 0x0010 | 20 |
| 1 | 1 | 0x0010 | 15 |
| 0 | 0 | 0x0020 | 5 |
| 0 | 1 | 0x0020 | 15 |
| ... | ... | ... | ... |

FIG. 6

| PROCESS SET | INPUT 1 | INPUT 2 | INPUT 3 | INPUT 4 | OUTPUT |
|---|---|---|---|---|---|
| A | n | m | *d | | s2 |
| B | ps | *d | | | s2 |
| C | ps | num | *d | | s2 |
| ... | ... | ... | ... | ... | ... |

FIG. 16

| PROCESS SET | INPUT 1 | INPUT 2 | INPUT 3 | INPUT 4 | OUTPUT | INPUT COM-BINATION NUMBER |
|---|---|---|---|---|---|---|
| A | n (10) | m (10) | *p (100) |  | s2 | 10000 |
| B | ps (10) | *p (100) |  |  | s2 | 1000 |
| C | ps (10) | num (1000) | *p (100) |  | s2 | 1000000 |
| ... | ... | ... | ... | ... | ... | ... |

FIG. 18

```
for(u=0;u<499;u++) {
  for(y=u+1;y<500;y++) {
    for(n=0;n<=3;n++) {
      for(m=0;m<=3;m++) {
        ...
        for (ni2=1; ni2<=n; ni2++) {
          for (ni3=1; ni3<=n; ni3++) {
            for (i3=ps; i3<1000; i3++) {
              pkm[ni2-1][ni3-1] += d[y][i3-ni2]*d[y][i3-ni3];
            }}}
        for (ni2=1; ni2<=n; ni2++) {
          for (mi2=0; mi2<=m; mi2++) {
            for (i3=ps; i3<1000; i3++) {
              pkm[ni2-1][n+mi2] += -d[y][i3-ni2]*d[u][i3-mi2];
            }}}
        for (mi2=0; mi2<=m; mi2++) {
          for (mi3=0; mi3<=m; mi3++) {
            for (i3=ps; i3<1000; i3++) {
              pkm[mi2+n][mi3+n]+=d[u][i3-mi2]*d[u][i3-mi3];
            }}}
        ...
}}}}
```

```
for(u=0;u<499;u++) {
 for(y=u+1;y<500;y++) {
  for(n=0;n<=3;n++) {
   for(m=0;m<=3;m++) {
    ...
    for (ni2=1; ni2<=n; ni2++) {
     for (ni3=1; ni3<=n; ni3++) {
      for (i3=ps; i3<1000; i3++) {
       pkm[ni2-1][ni3-1] += d[y][i3-ni2]*d[y][i3-ni3];
      }
    }}
    ...
    for (ni2=1; ni2<=n; ni2++) {
     for (mi2=0; mi2<=m; mi2++) {
      for (i3=ps; i3<1000; i3++) {
       pkm[ni2-1][n+mi2] += -d[y][i3-ni2]*d[u][i3-mi2];
      }
    }}
    ...
    for (mi2=0; mi2<=m; mi2++) {
     for (mi3=0; mi3<=m; mi3++) {
      for (i3=ps; i3<1000; i3++) {
       pkm[mi2+n][mi3+n] += d[u][i3-mi2]*d[u][i3-mi3];
      }
    }}
    ...
}}}}
```

FEATURE 1
- PROCESSING FOR THE SAME ARRAY (*d[y])
- ELEMENT PRODUCT IN ACCORDANCE WITH DISTANCE BETWEEN ELEMENTS

FEATURE 2
- ELEMENT PRODUCT IN ACCORDANCE WITH DISTANCE BETWEEN ELEMENTS FOR DIFFERENT ARRAYS (*d[y] AND *d[u])

FEATURE 3
- PROCESSING FOR THE SAME ARRAY (*d[u])
- ELEMENT PRODUCT IN ACCORDANCE WITH DISTANCE BETWEEN ELEMENTS

```
for(u=0;u<499;u++){
 for(y=u+1;y<500;y++){
  for(n=0;n<=3;n++){
   for(m=0;m<=3;m++){
    ...
    for (ni2=1; ni2<=n; ni2++) {
     for (ni3=1; ni3<=n; ni3++) {
      dist=abs(ni3-ni2);
      for (i3=ps-ni3; i3<1000-ni3; i3++) {
       pkm[ni2-1][ni3-1] += d[y][i3]*d[y][i3+dist];
    }}}
    for (ni2=1; ni2<=n; ni2++) {
     for (mi2=0; mi2<=m; mi2++) {
      for (i3=ps; i3<1000; i3++) {
       pkm[ni2-1][n+mi2] += -d[y][i3-ni2]*d[u][i3-mi2];
    }}}
    for (mi2=0; mi2<=m; mi2++) {
     for (mi3=0; mi3<=m; mi3++) {
      dist=abs(mi3-mi2);
      for (i3=ps-mi3; i3<1000-mi3; i3++) {
       pkm[mi2+n][mi3+n]+= d[u][i3]*d[u][i3+dist];
    }}}
    ...
}}}}
```

FIG. 26

```
for(i1=0;i1<500;i1++)
  for(i2=0;i2<max(3-1,3);i2++)
    for(i3=0;i3<1000-i2;i3++)
      tbl1[i1][i2][i3]=d[i1][i3]*d[i1][i3+i2];
...
for(u=0;u<499;u++) {
  for(y=u+1;y<500;y++) {
    for(n=0;n<=3;n++) {
      for(m=0;m<=3;m++) {
        ...
        for (ni2=1; ni2<=n; ni2++) {
          for (ni3=1; ni3<=n; ni3++) {
            dist=abs(ni3-ni2);
            for (i3=ps-ni3; i3<1000-ni3; i3++) {
              pkm[ni2-1][ni3-1] += tbl1[y][dist][i3];
        }}}
        for (ni2=1; ni2<=n; ni2++) {
          for (mi2=0; mi2<=m; mi2++) {
            for (i3=ps; i3<1000; i3++) {
              pkm[ni2-1][n+mi2] += -d[y][i3-ni2]*d[u][i3-mi2];
        }}}
        for (mi2=0; mi2<=m; mi2++) {
          for (mi3=0; mi3<=m; mi3++) {
            dist=abs(mi3-mi2);
            for (i3=ps-mi3; i3<1000-mi3; i3++) {
              pkm[mi2+n][mi3+n] += tbl1[u][dist][i3];
        }}}
        ...
}}}}
```

FIG. 29

DATA PROCESSING APPARATUS, DATA PROCESSING METHOD, AND PROGRAM RECORDING MEDIUM

This application is a National Stage Entry of PCT/JP2017/018978 filed on May 22, 2017, which claims priority from Japanese Patent Application 2016-102285 filed on May 23, 2016, the contents of all of which are incorporated herein by reference, in their entirety.

TECHNICAL FIELD

This invention relates to a data processing apparatus capable of processing a program at high speed, and, in particular, to a data processing apparatus for carrying out reuse of an arithmetic result, a data processing method, and a program recording medium.

BACKGROUND ART

In general, a program is configured by combining a plurality of processes (hereinafter referred to as "process sets"), such as functions and loops, with series relationships and nested relations. Each process comprises a number of inputs (hereinafter referred to as "a group of inputs"), a processing block for performing arithmetic, and a number of outputs (hereinafter "a group of outputs") which is an arithmetic result by the processing block.

FIG. 1 is a view illustrating a configuration of a general program. The program illustrated in FIG. 1 comprises six process sets (a process set 1 to a process set 6). The process set 3 includes the process set 4 and the process set 5. That is, the process set 4 and the process set 5 are nested in the process set 3. As shown in FIG. 1, in the program, the process set 1, the process set 2, the process set 3, and the process set 6 are connected in series.

In the example illustrated in FIG. 1, the process set 1 comprises a group of inputs 1, a processing block 1, and an output 1.

A single process set performs arithmetic with reference to a number of inputs. Accordingly, a number of intermediate results are frequently generated in the processing block. In addition, a process set such as a function is executed many times from different program locations. Accordingly, if the program is viewed as a whole, there is a case where the same arithmetic is performed for the same group of inputs. In order to process such as a program at high speed, high reusability of the arithmetic result is important.

Patent Document 1 describes an example of a data processing apparatus configured to reuse an arithmetic result. Specifically, the data processing apparatus disclosed in Patent Document 1 stores a start address, an end address, and input/output addresses of a loop to serve as a reuse target. When a decoded instruction sequence is a loop and when the start address, the end address, and the input/output addresses which are stored with respect to the loop are perfectly congruent, a stored output value is produced as an output of the loop.

Patent Document 2 discloses a "compile processing apparatus" for improving efficiency of value reuse by shortening a bit length of data held in a memory for saving executed results upon the value reuse (memorization). The compile processing apparatus disclosed in Patent Document 2 comprises a source program storing portion, a reuse instruction distinguishing portion, a hash function determining portion, a machine language program generating portion, and an object program storing portion. The source program storing portion stores a source program for carrying out compiling, that includes a reuse section for which the executed results are used again. The reuse instruction distinguishing portion analyzes the source program read out of the source program storing portion to generate a program including any reuse instruction.

The reuse instruction distinguishing portion comprises a reuse candidate section extracting portion, a reuse candidate section analyzing portion, a reuse degree generating portion, and a reuse instruction converting portion. The reuse candidate section extracting portion extracts, from the program, reuse candidate sections among a plurality of instruction sections to serve as a candidate of the reuse section for which the executed results are reused. It is assumed that the instruction sections for which the compile processing apparatus processes are functions or loops. The reuse candidate section extracting portion extracts, as the reuse candidate sections, the instruction sections for which the instructions such as the functions and the loops may be called a plurality of times. The reuse candidate section extracting portion excludes, from the reuse candidate sections, any functions having no possibility to reuse the executed results such as functions each of which produces a different executed results even if an input value is the same. The input value is a value which is required for executing the function or the loop and which is composed of an argument. The reuse candidate section analyzing portion analyzes a use mode relating to each reuse candidate section extracted by the reuse candidate section extracting portion. The reuse degree generating portion generates, based on an analyzed result supplied from the reuse candidate section analyzing portion, a reuse degree indicative of a degree at which the executed results of the reuse candidate section are used again. For example, the reuse degree generating portion generates the reuse degree in accordance with a combination of input values in the reuse candidate section in question. The smaller the number of combinations of the input values in the reuse candidate section becomes, the higher the degree of reuse becomes. The reuse degree generating portion generates, based on the analyzed result of the function, the reuse degree which has, as a denominator, the number of combinations of the input values. The reuse instruction converting portion determines, as the reuse sections, the reuse candidate sections in the order from a higher reuse degree.

Patent Document 3 discloses a "data processing apparatus" for improving efficiency of value reuse by evacuating executed results from a memory for saving the executed results upon the value reuse (memorization). The data processing apparatus disclosed in Patent Document 3 is mutually connected to a main storage through a bus. It is assumed that instruction sections for which the data processing apparatus executes processing are functions or loops. The data processing apparatus comprises a primary cache, a processor core, a history control portion, and a history conversion portion. The primary cache comprises an instruction cache and a data cache. The instruction cache supplies the processor core with a reuse instruction supplied from the main storage. The reuse instruction is an instruction for making the data processing apparatus carry out processing for reusing the executed result when a reuse section is called, by distinguishing, among instruction sections, the reuse section for which the executed result is used again from sections for which the executed result is not used.

When the processor core is not supplied with any executed result from the history control portion in a case where an input instruction is the reuse instruction for specifying the reuse section, the processor core delivers an executed result being a result obtained by executing this instruction to the data cache and the history control portion. The history control portion holds and controls the executed result for the reuse section. The history control portion holds, as an execution history, a combination of section identifying information of the reuse section supplied from the processor core, input values, and the executed result. When the history control portion is supplied from the processor core with a start address and the input values of a function or a loop, the history control portion searches the executed history including the start address and the input values.

PRIOR ART DOCUMENT(S)

Patent Document(s)

Patent Document 1: JP 2004-258905 A
Patent Document 2: JP 2011-96153 A
Patent Document 3: JP 2011-39859 A

SUMMARY OF THE INVENTION

Problem to be Solved by the Invention

According to Patent Document 1, for a processing block having a large number of different inputs, a total number of combinations of possible values of such a number of inputs becomes very large. This results in a problem of low reusability.

In Patent Document 2, it is assumed that the instruction sections for which the compile processing apparatus processes are functions or loops. Accordingly, Patent Document 2 is not intended for a whole of functions of a program and a part of the functions and is not intended, for example, for an inclusion relationship in FIG. 1 in which the process set 4 and the process set 5 are included in the process set 3. As a result, in Patent Document 2, it is impossible to produce a result that the process set 3 is selected as a process set with the maximum reuse index value.

In Patent Document 3 also, it is assumed that instruction sections for which the data processing apparatus executes processing are functions or loops. Accordingly, Patent Document 3 also has a problem similar to that of Patent Document 2. In addition, Patent Document 3 merely discloses the data processing apparatus comprising the history control portion for searching the execution history including the start address and the input values.

It is an object of this invention to provide a data processing apparatus, a data processing method, and a program recording medium which are capable of resolving any of the above-mentioned problems.

Means to Solve the Problem

A data processing apparatus according to this invention comprises a process set selection unit configured to generate, based on a process set comprising a processing block configured to carry out arithmetic on a group of inputs and a group of outputs produced by the processing block, a group of new inputs having a combination number which is less than that of the group of inputs and a new processing block for the group of new inputs; and a reuse execution unit configured to prepare, based on the new processing block configured to perform arithmetic on the group of new inputs and a group of outputs produced by the new processing block, an associated result which associates the group of new inputs and the group of outputs, the reuse execution unit being configured to produce a group of outputs obtained from the associated result when the group of new inputs have values equal to those of the group of inputs, the reuse execution unit being configured to execute the new processing block to register an executed result to the associated result when the group of new inputs have values different from those of the group of inputs.

A data processing method according to this invention comprises generating, in a process set selection unit, based on a process set comprising a processing block configured to carry out arithmetic on a group of inputs and a group of outputs produced by the processing block, a group of new inputs having a combination number which is less than that of the group of inputs and a new processing block for the group of new inputs; and preparing, in a reuse execution unit, based on the new processing block configured to perform arithmetic on the group of new inputs and a group of outputs produced by the new processing block, an associated result which associates the group of new inputs and the group of outputs, producing, in the reuse execution unit, a group of outputs obtained from the associated result when the group of new inputs have values equal to those of the group of inputs, and executing, in the reuse execution unit, the new processing block to register an executed result to the associated result when the group of new inputs have values different from those of the group of inputs.

A program recording medium according to this invention records a data processing program for making a computer function as process set selection means for generating, based on a process set comprising a processing block configured to carry out arithmetic on a group of inputs and a group of outputs produced by the processing block, a group of new inputs having a combination number which is less than that of the group of inputs and a new processing block for the group of new inputs; and reuse execution means for preparing, based on the new processing block configured to perform arithmetic on the group of new inputs and a group of outputs produced by the new processing block, an associated result which associates the group of new inputs and the group of outputs, the reuse execution means being for producing a group of outputs obtained from the associated result when the group of new inputs have values equal to those of the group of inputs, the reuse execution means being for executing the new processing block to register an executed result to the associated result when the group of new inputs have values different from those of the group of inputs.

Advantageous Effect of Invention

According to this invention, it is possible to enhance reusability of executed results.

BRIEF DESCRIPTION OF THE DRAWINGS

FIG. 6 is a view for illustrating an example of an input/output table which is used in a step S106 in FIG. 5;

FIG. 16 is a view for illustrating a table including a group of inputs and an output of each process set;

FIG. 18 is a view for illustrating a calculation method of combination numbers for each process set;

FIG. 23 is a view for illustrating an example of a targeted partial program which is executed by the data processing apparatus illustrated in FIG. 21;

FIG. 24 is a view for illustrating an example in which a new input definition unit illustrated in FIG. 21 lists up features at a step S501 in FIG. 22;

FIG. 26 is a view for illustrating an example in which a new process set definition unit illustrated in FIG. 21 creates a new process set based on the common feature at a step S502 in FIG. 22;

FIG. 29 is a view for illustrating an example of realization in a reuse execution unit illustrated in FIG. 21 in a case of pre-execution.

MODES FOR EMBODYING THE INVENTION

Now, description will be made in detail about example embodiments of this invention with reference to the drawings. The same reference symbols are assigned to the same components and overlapped explanation may be omitted.

Figure 1:
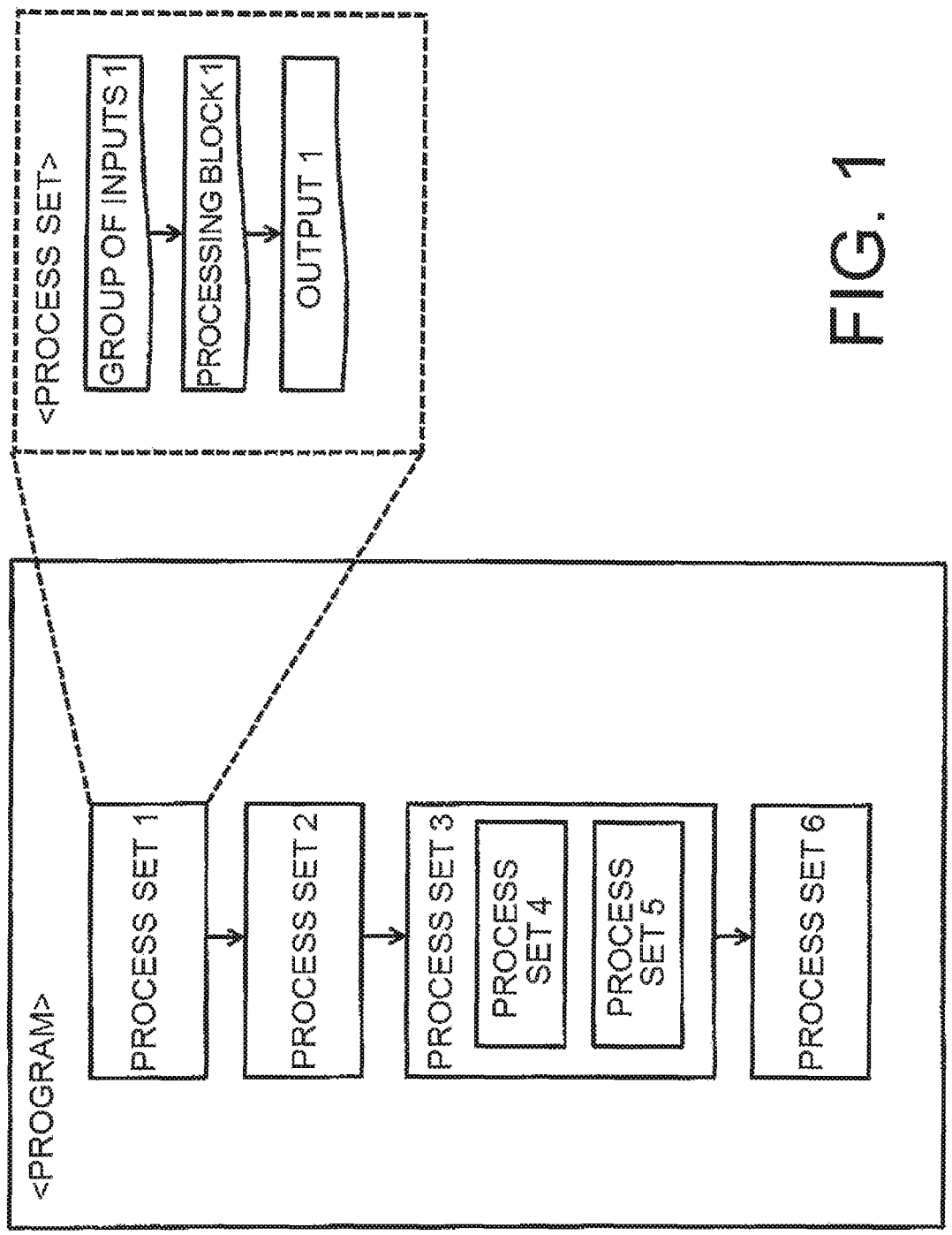
FIG. 1 is a diagram for illustrating a configuration of a general program.
Figure 2:
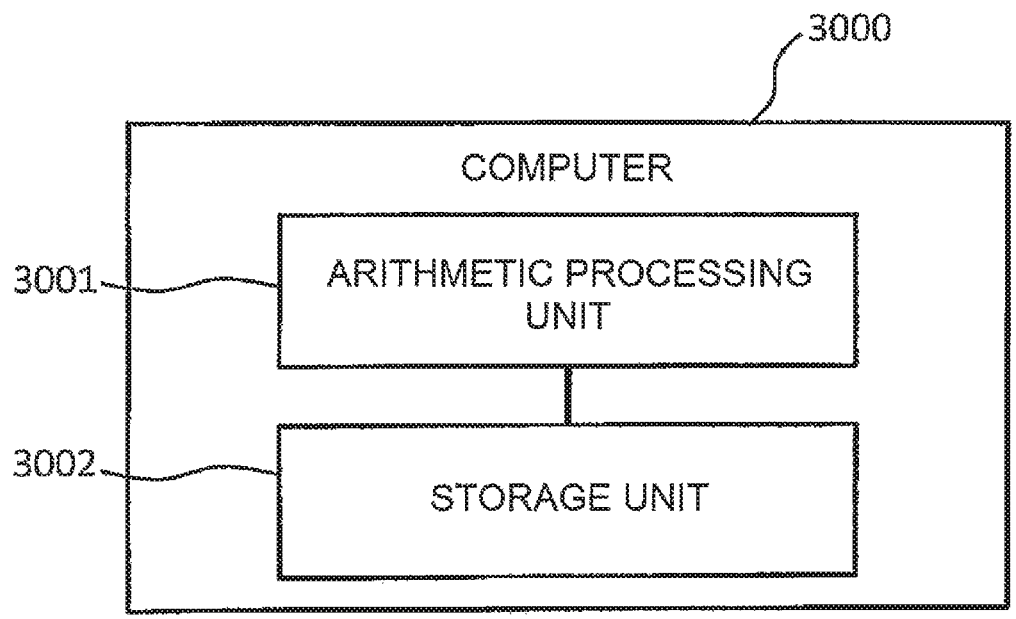
FIG. 2 is a block diagram for illustrating a hardware configuration of a computer to which a data processing apparatus according to this invention is applicable.

At first referring to FIG. 2, description will proceed to a hardware configuration of a computer 3000 to which a data processing apparatus 100 (which will be later be described) according to this invention is applicable.

The computer 3000 comprises an arithmetic processing unit 3001 and a storage unit 3002. Although not illustrated in the figure, the computer 3000 comprises an input unit and an output unit. These components constructing the computer 3000 are connected so as to be mutually communicable with each other via any communication means (e.g. a communication bus, a communication network, or the like). Hereinafter, an overview of each component will be described.

The arithmetic processing unit 3001 comprises a special-purpose or a general-purpose processor (e.g. CPU (central processing unit)) which may execute any arithmetic processing on data stored in the storage unit 3002 which will later be described. For example, the arithmetic processing unit 3001 may execute any software program (a computer program which may hereinafter be simply called "a program") stored in the storage unit 3002. The program may be held in any device (not shown) inside or outside the computer 3000 without being limited to the storage unit 3002. In this event, the arithmetic processing unit 3001 reads out and executes the program as required.

The storage unit 3002 comprises a storage device (a memory) which is capable of storing any data. The storage unit 3002 may be implemented by a volatile or a non-volatile memory device which is implemented by a semiconductor storage device or the like. The storage unit 3002 is not limited to the above-mentioned devices and is able to be implemented by any storage devices (e.g. a magnetic storage device, a magneto-optical storage device, an optical storage device, and so on).

The input unit comprises a unit which is capable of inputting any data to the computer 3000. The input unit is able to be implemented by any input unit in accordance with the configuration of the computer 3000. That it, the input unit may be, for example, a network device which is capable of inputting any data via a network. In addition, the input unit may be an interface unit which is capable of directly inputting data by a user of the computer 3000. Furthermore, the input unit may be, for example, a reading device of a storage medium (a recording medium) that is capable of inputting data via any storage medium (recording medium).

The output unit comprises a unit which is capable of outputting a processed result (an arithmetic result) in the computer 3000. The output unit may comprise, for example, a printer, an LCD (liquid crystal display), or the like.

First Example Embodiment

Description will proceed to a first example embodiment of this invention.

[Description of Configuration]

Figure 3:
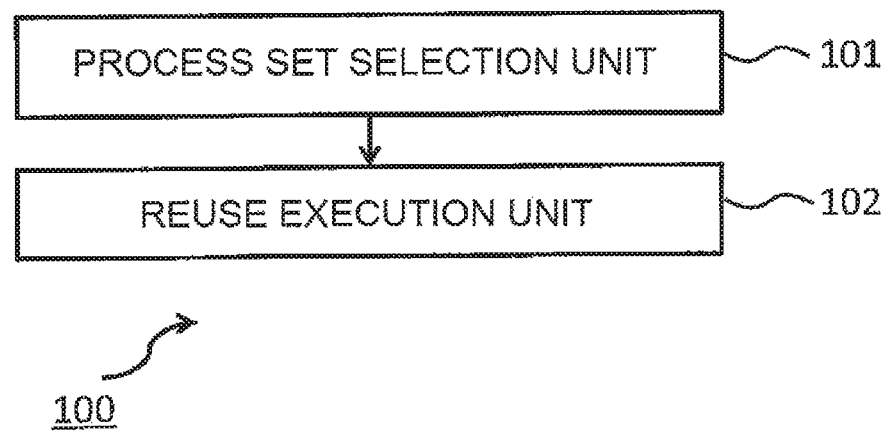
FIG. 3 is a block diagram for illustrating a configuration of the data processing apparatus according to a first example embodiment of this invention.

FIG. 3 is a block diagram for illustrating a configuration of a data processing apparatus 100 according to the first example embodiment of this invention. In the first example embodiment, the data processing apparatus 100 comprises a process set selection unit 101 and a reuse execution unit 102.

The process set selection unit 101 generates, based on a process set comprising a processing block for carrying out arithmetic on a group of inputs and a group of outputs produced by the processing block, a group of new inputs having a combination number which is less than that of the group of inputs and a new processing block for the group of new inputs.

The reuse execution unit 102 prepares, based on the new processing block for performing arithmetic on the group of new inputs and a group of outputs produced by the new processing block, an associated result which associates the group of new inputs and the group of outputs, produces a group of outputs obtained from the associated result when the group of new inputs have values equal to those of the group of inputs, and executes the new processing block to register an executed result to the associated result when the group of new inputs have values different from those of the group of inputs.

[Description of Operation]

Next referring to flow charts of FIGS. 4 and 5, description will be made in detail about an operation of the data processing apparatus 100 according to the first example embodiment.

Figure 4:
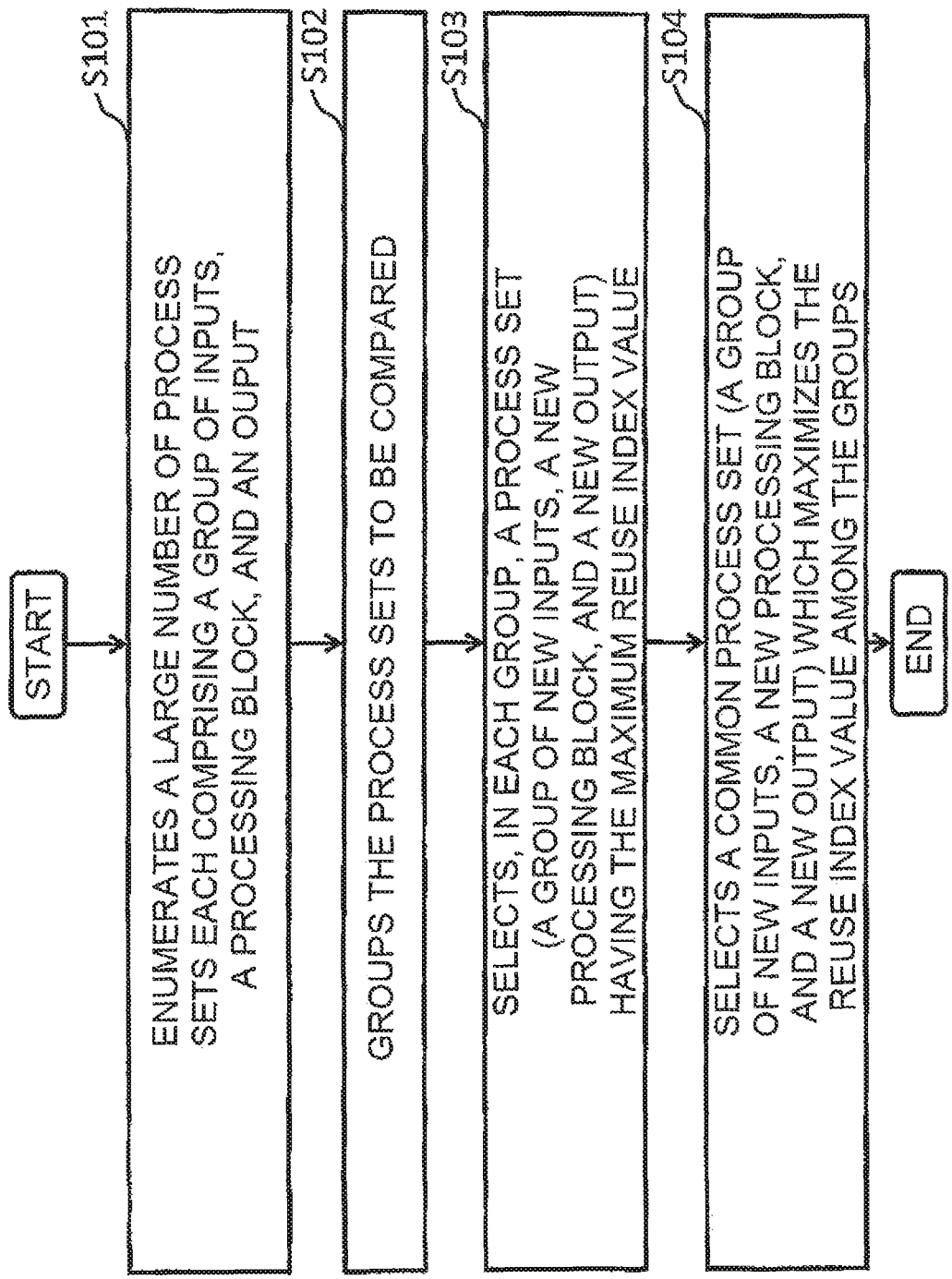
FIG. 4 is a flow chart for use in explaining an operation in a process set selection unit illustrated in FIG. 3.

FIG. 4 is a flow chart for use in explaining an operation in the process set selection unit 101.

First of all, the process set selection unit 101 enumerates a large number of process sets each comprising a group of inputs, a processing block, and an output (step S101). Subsequently, the process selection unit 101 groups the process sets to be compared (step S102).

Next, the process set selection unit 101 selects, in each group, a process set (a group of new inputs, a new processing block, and a new output) having the maximum reuse index value (step S103). Subsequently, the process set selection unit 101 selects a common process set (a group of new inputs, a new processing block, and a new output) which maximizes the reuse index value among the groups (step S104). Thus, processing of the process set selection unit 101 comes to an end.

Figure 5:
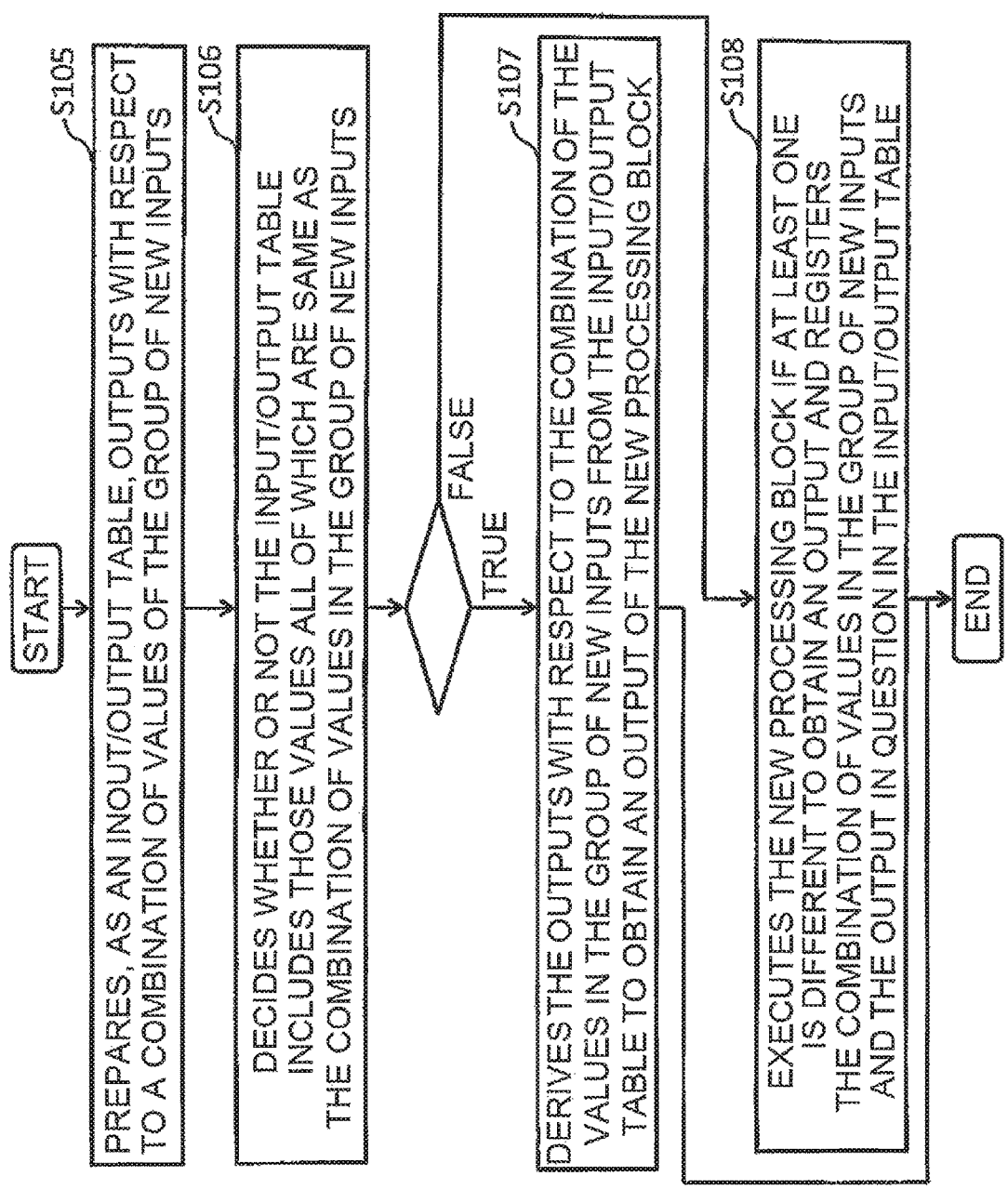
FIG. 5 is a flow chart for use in explaining an operation in a reuse execution unit illustrated in FIG. 3.

FIG. 5 is a flow chart for use in explaining an operation of the reuse execution unit 102.

First of all, the reuse execution unit 102 prepares, as an input/output table, outputs with respect to a combination of values of the group of new inputs (step S105). Subsequently, the reuse execution unit 102 decides whether or not the input/output table includes those values all of which are same as the combination of values in the group of new inputs (step S106).

If a decided result is true, the reuse execution unit 102 derives the output with respect to the combination of the values of the group of new inputs from the input/output table to obtain an output of the new processing block (step S107). Thereafter, the reuse execution unit 102 ends the processing.

On the other hand, if the decided result is false, the reuse execution unit 102 executes the new processing block, if at least one is different, to obtain an output and registers the combination of values in the group of new inputs and the output in question in the input/output table (step S108). Thereafter, the reuse execution unit 102 ends the processing.

FIG. 6 is a view showing an example of the input/output table used in the above-mentioned step S106. In this example, an arithmetic result of the processing block for an input 1, an input 2, and an input 3 is produced as an output. That is, in the step S106, the reuse execution unit 102 determines whether or not respective values of the input 1, the input 2, and the input 3 are equal to any values in the input/output table.

[Description of Effect of First Example Embodiment]

Next, an effect of the first example embodiment will be described.

According to the first example embodiment, it is possible to improve reusability by a group of new inputs having a combination number of values less than that of the group of original inputs by generating the group of new inputs using a temporal variable defined by a part of the group of inputs and a new process set which produces an arithmetic result by a new processing block in accordance with the group of new inputs.

Second Example Embodiment

Description will proceed to a second example embodiment of this invention.

[Description of Configuration]

A configuration of a data processing apparatus according to the second example embodiment is identical with that of the data processing apparatus 100 of the above-mentioned first example embodiment illustrated in FIG. 3.

In the data processing apparatus according to the second example embodiment, an operation of the reuse execution unit 102 of the data processing apparatus 100 according to the above-mentioned first example embodiment is different in the manner which will be described hereunder.

[Description of Operation]

Referring to a flow chart of FIG. 7, description will be made in detail about the operation of the reuse execution unit 102 of the data processing apparatus 100 according to the second example embodiment.

Figure 7:
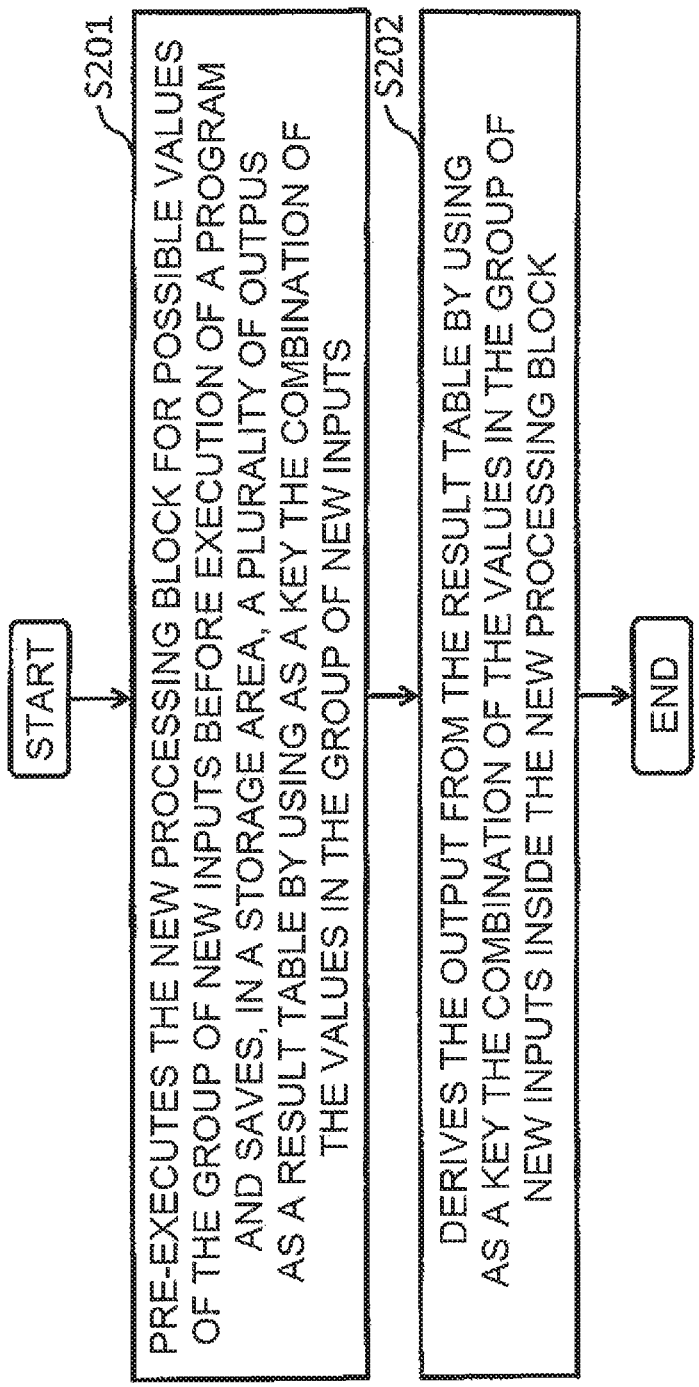
FIG. 7 is a flow chart for use in explaining an operation in a reuse execution unit according to a second example embodiment of this invention.

FIG. 7 is the flow chart for use in explaining the operation in the reuse execution unit 102 according to the second example embodiment.

First of all, the reuse execution unit 102 pre-executes the new processing block for possible values of the group of new inputs before execution of a program and saves, in a storage area, a plurality of outputs as a result table by using as a key the combination of the values in the group of new inputs (step S201).

Subsequently, the reuse execution unit 102 derives the output from the result table by using as a key the combination of the values in the group of new inputs inside the new processing block (step S202). Thereafter, the reuse execution unit 102 ends the processing.

Figure 8:
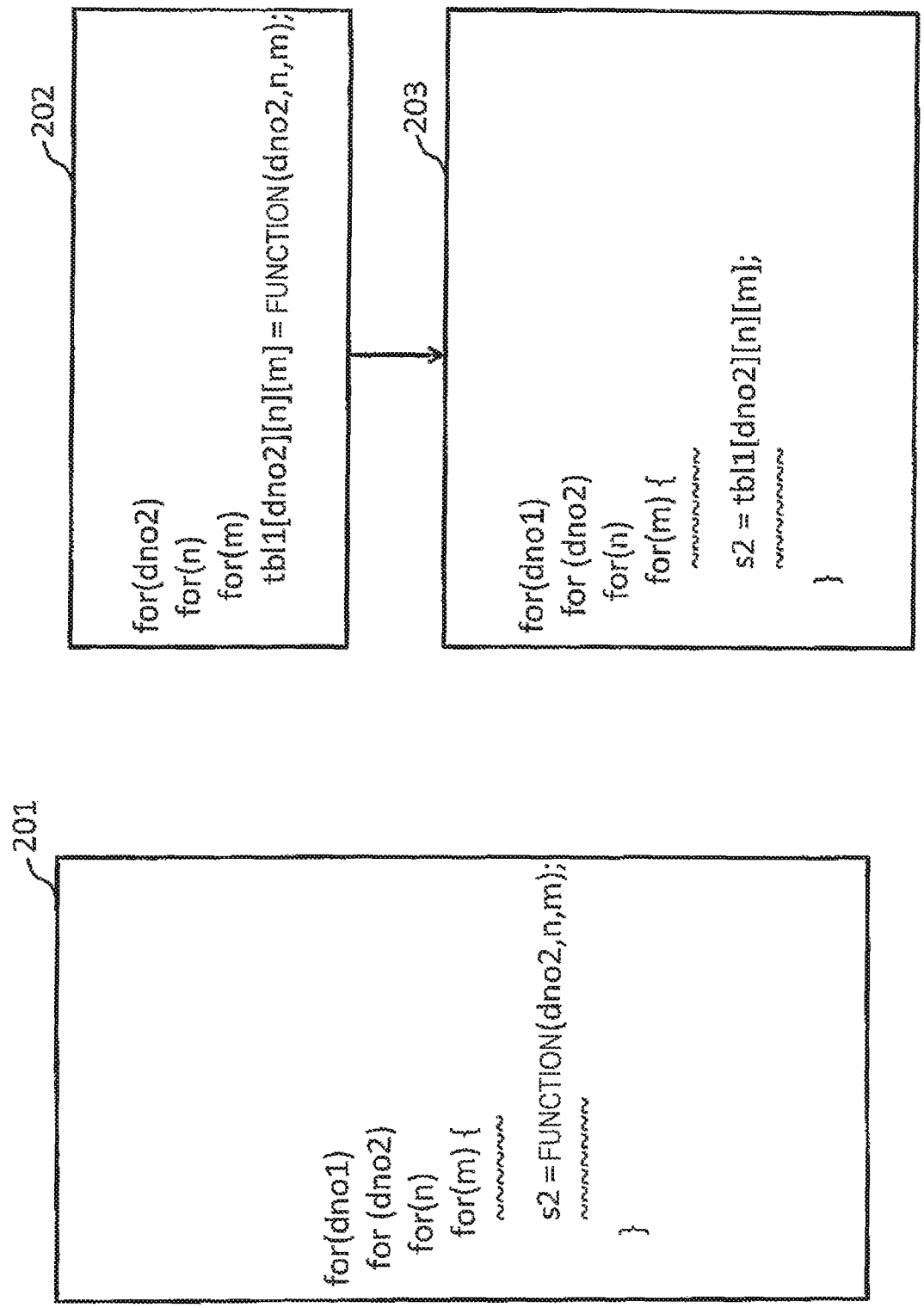
FIG. 8 is a view for illustrating an example of a reuse execution program generated.

FIG. 8 is a view showing an example of a generated reuse execution program. This example shows a case where a pre-execution program 202 and a reuse execution program 203 are prepared from an original program 201.

At the step S201 in FIG. 7, the reuse execution unit 102 prepares the pre-execution program 202 and saves, in the storage area, an output result of a function executed using an input 1 (dno2), an input 2 ($n$), and an input 3 ($m$) as the result table (tb11).

At the step S202 in FIG. 7, the reuse execution unit 102 prepares the reuse execution program 203 and refers to an output result on the result table (tb11) by using the input 1 (dno2), the input 2 (*n*), and the input 3 (*m*) as the key.

[Description of Effect of Second Example Embodiment]

Next, an effect of the second example embodiment will be described.

According to the second example embodiment, it is possible to execute a program at higher speed because reusability can be improved without branching.

Third Example Embodiment

Description will proceed to a third example embodiment of this invention.

[Description of Configuration]

Figure 9:
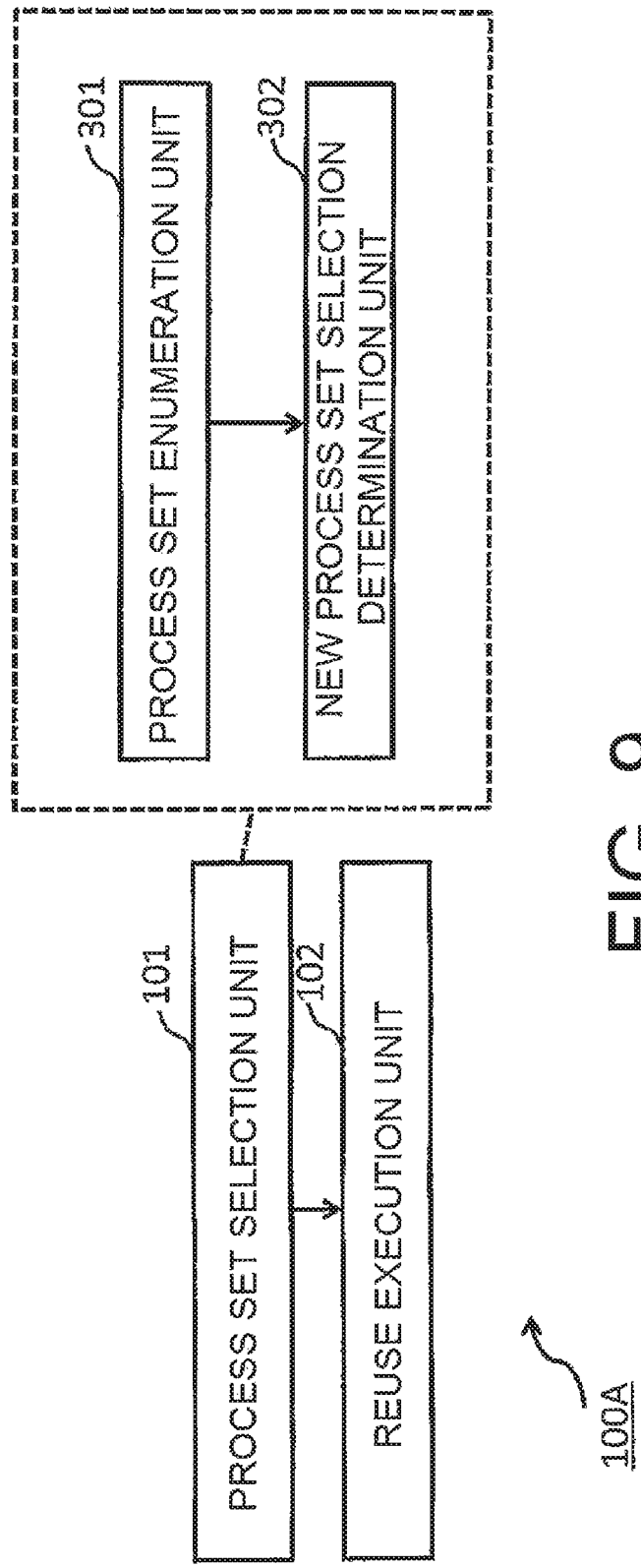
FIG. 9 is a block diagram for illustrating a configuration of the data processing apparatus according to a third example embodiment of this invention.

FIG. 9 is a block diagram for illustrating a configuration of a data processing apparatus 100A according to a third example embodiment of this invention. In the third example embodiment, the process set selection unit 101 in the data processing apparatus 100A comprises a process set enumeration unit 301 and a new process set selection determination unit 302.

[Description of Operation]

Figure 10:
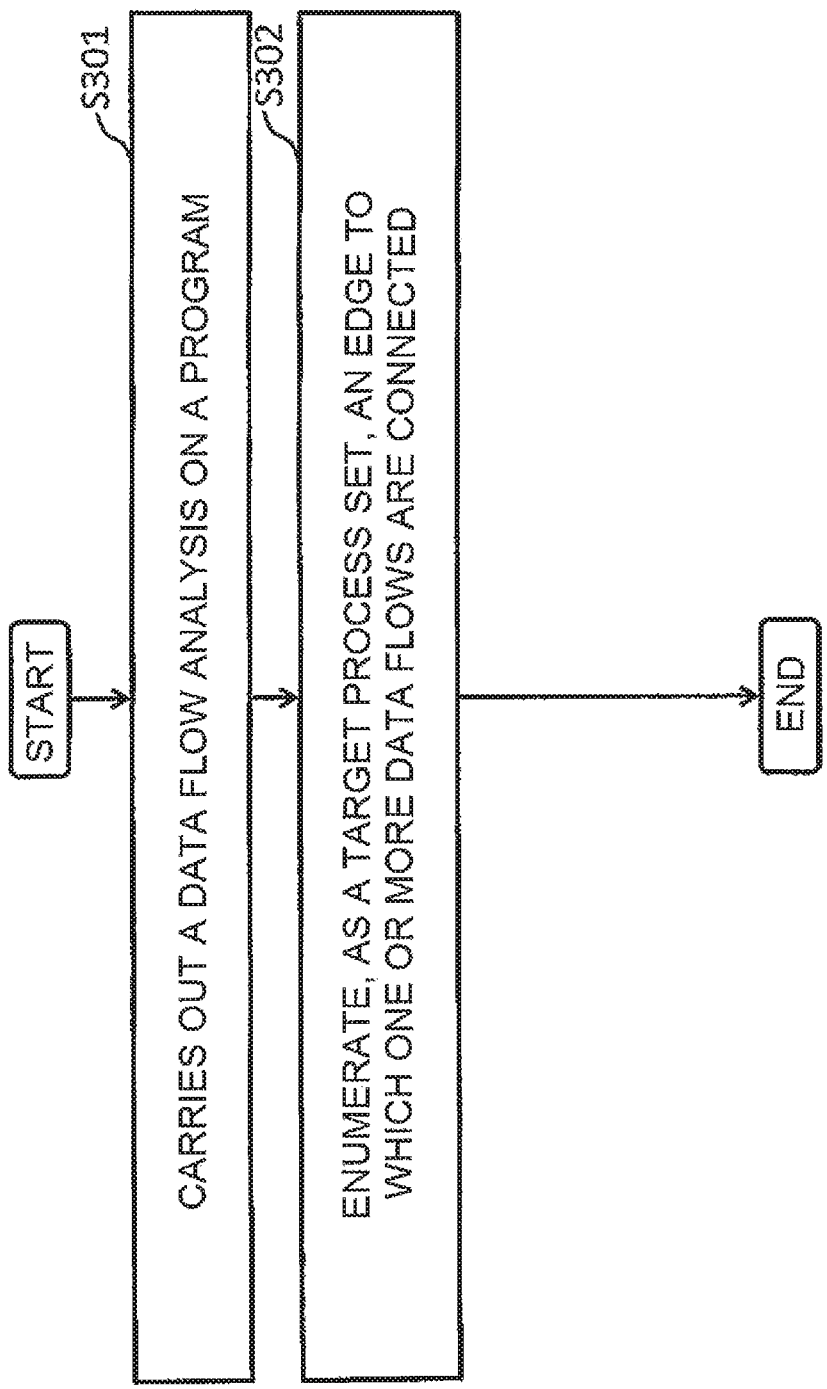
FIG. 10 is a flow chart for use in explaining an operation in a process set enumeration unit illustrated in FIG. 9.

FIG. 10 is a flow chart for use in explaining an operation in the process set enumeration unit 301.

First of all, the process set enumeration unit 301 carries out a data flow analysis on a program (step S301). Subsequently, the process set enumeration unit 301 enumerates, as a target process set, an edge to which one or more data flows are connected (step S302). Thereafter, the process set enumeration unit 301 ends the processing.

Figure 11:
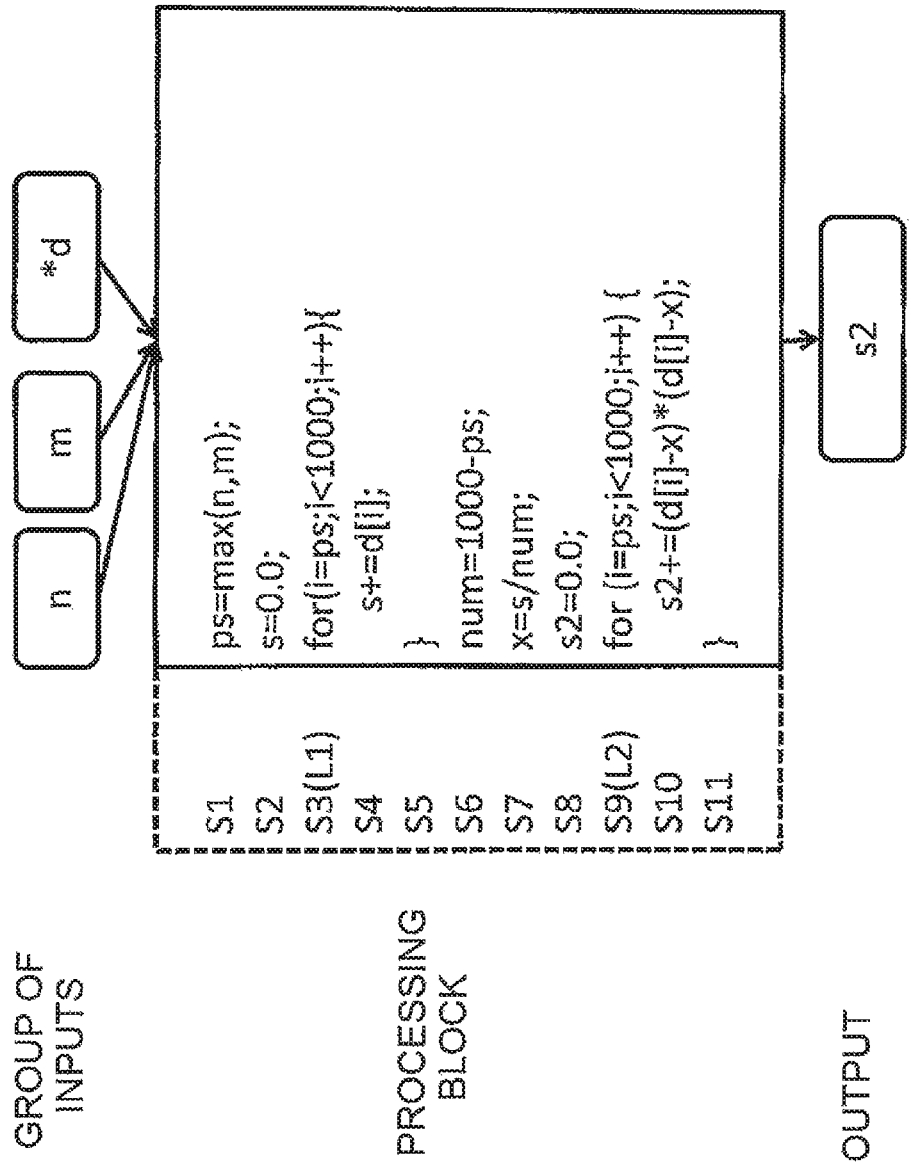
FIG. 11 is a view for illustrating an example of a program which is executed by the data processing apparatus illustrated in FIG. 9.

FIG. 11 is a view showing an example of a program to be executed by the data processing apparatus 100A according to the third example embodiment.

A group of inputs comprises n, m, and *d (pointer). A processing block performs arithmetic along a flow from a row number S1 to a row number S11. An output comprises s2.

Figure 12:
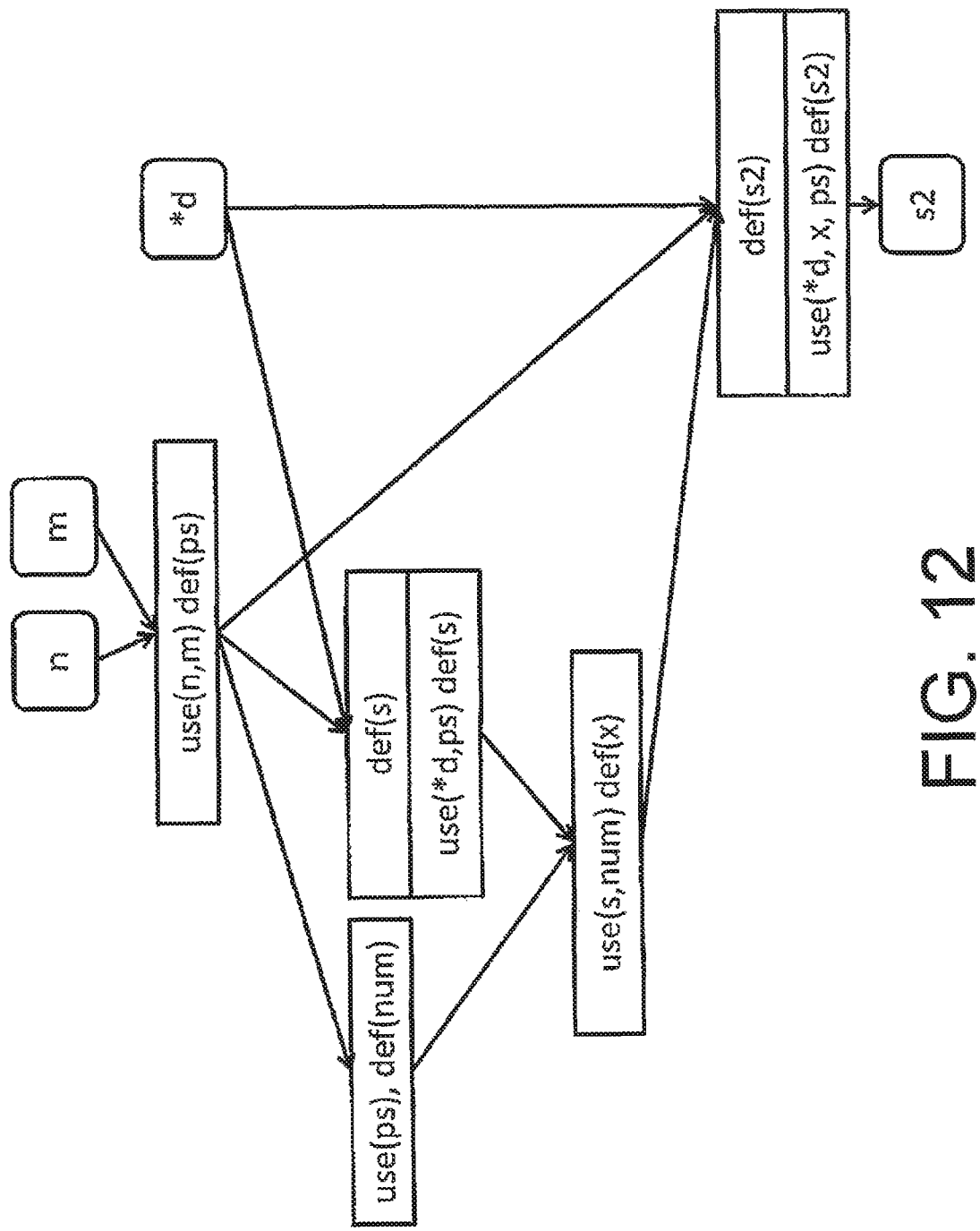
FIG. 12 is a view for illustrating an example of a data flow analyzed result for the program illustrated in FIG. 11.

FIG. 12 is a view showing an example of a data flow analyzed result for the program illustrated in FIG. 11.

Figure 13:
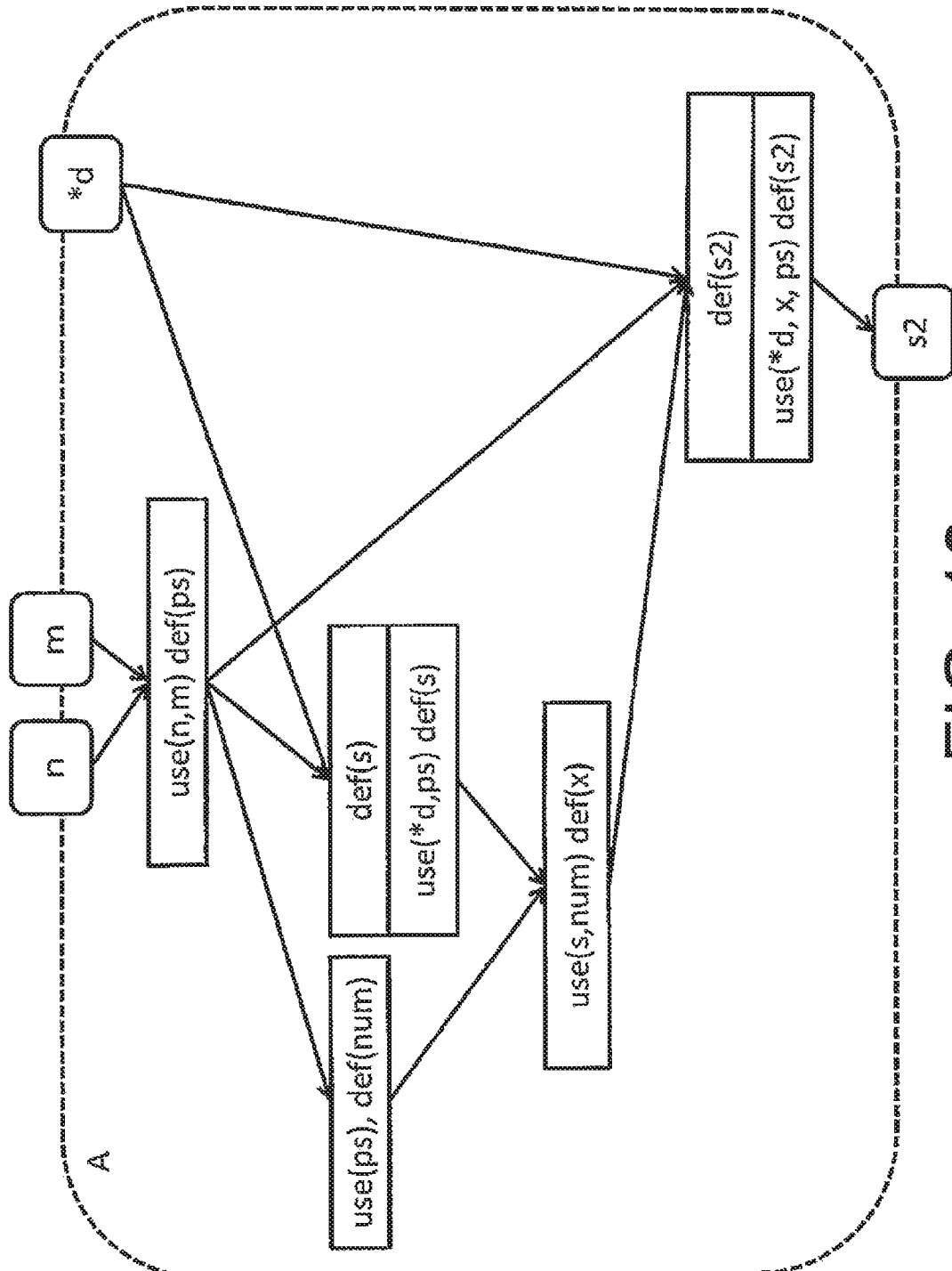
FIG. 13 is a view for illustrating an example in which a process set A is enumerated from the data flow analyzed result.
Figure 14:
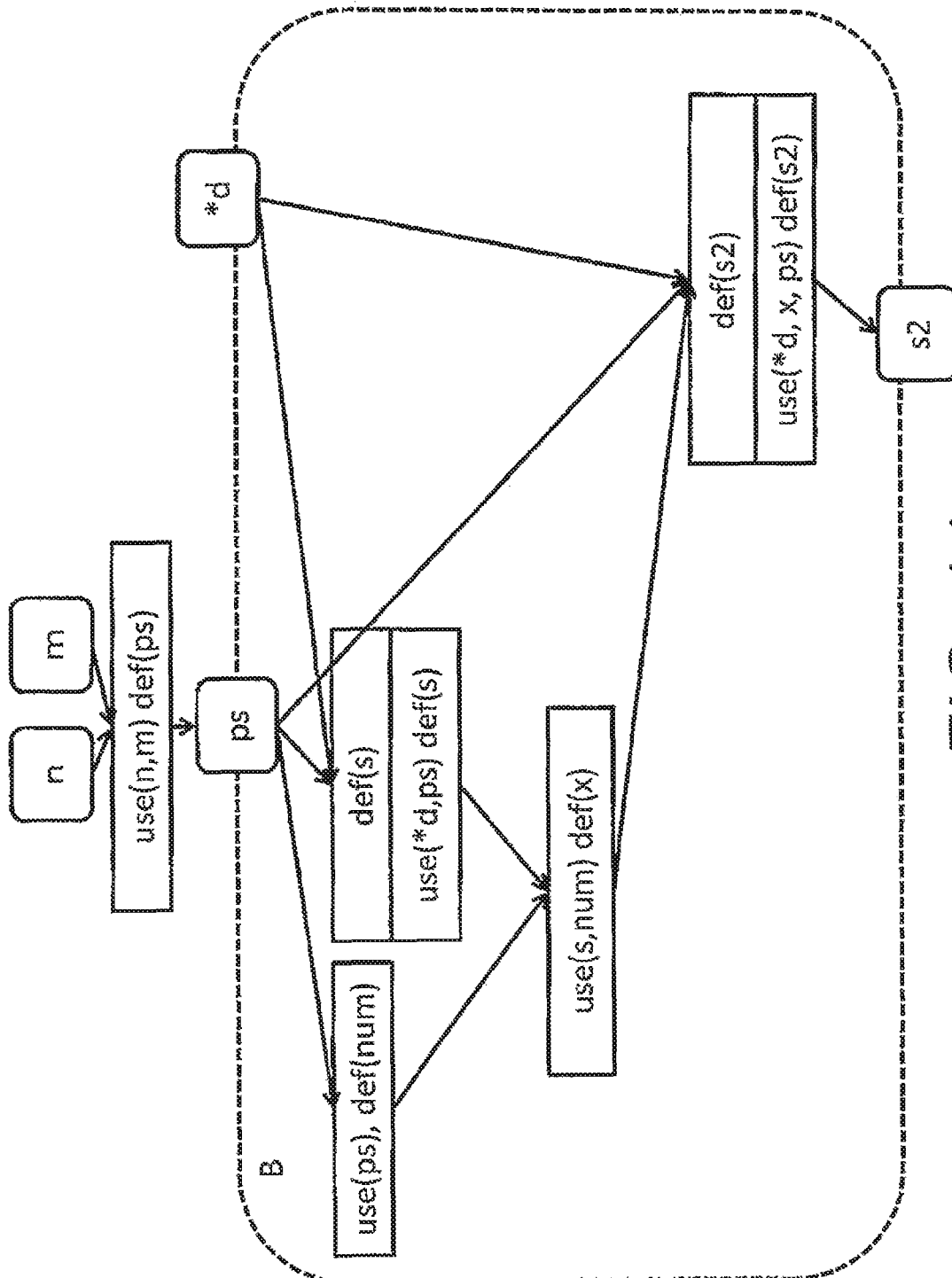
FIG. 14 is a view for illustrating an example in which a process set B is enumerated from the data flow analyzed result.
Figure 15:
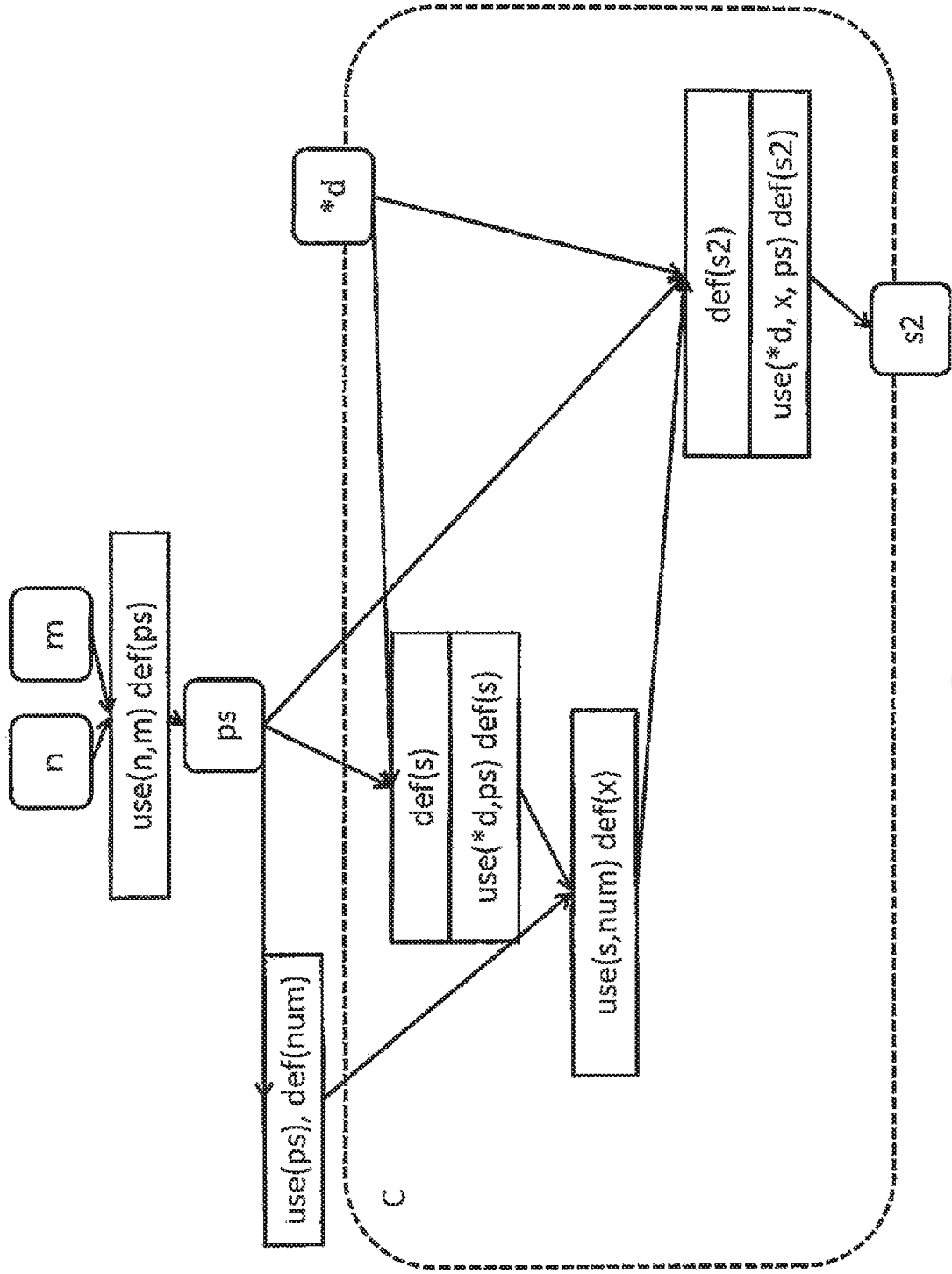
FIG. 15 is a view for illustrating an example in which a process set C is enumerated from the data flow analyzed result.

FIGS. 13, 14, and 15 are views showing examples in which process sets A, B, and C are enumerated based on the data flow analyzed result (FIG. 12), respectively. Blocks enclosed by dotted lines are examples of the process sets.

FIG. 16 is a view showing a table comprising a group of inputs and an output in the respective process sets A, B, and C. There is a combination of a number of inputs and an output for each of the process sets A, B, and C.

Figure 17:
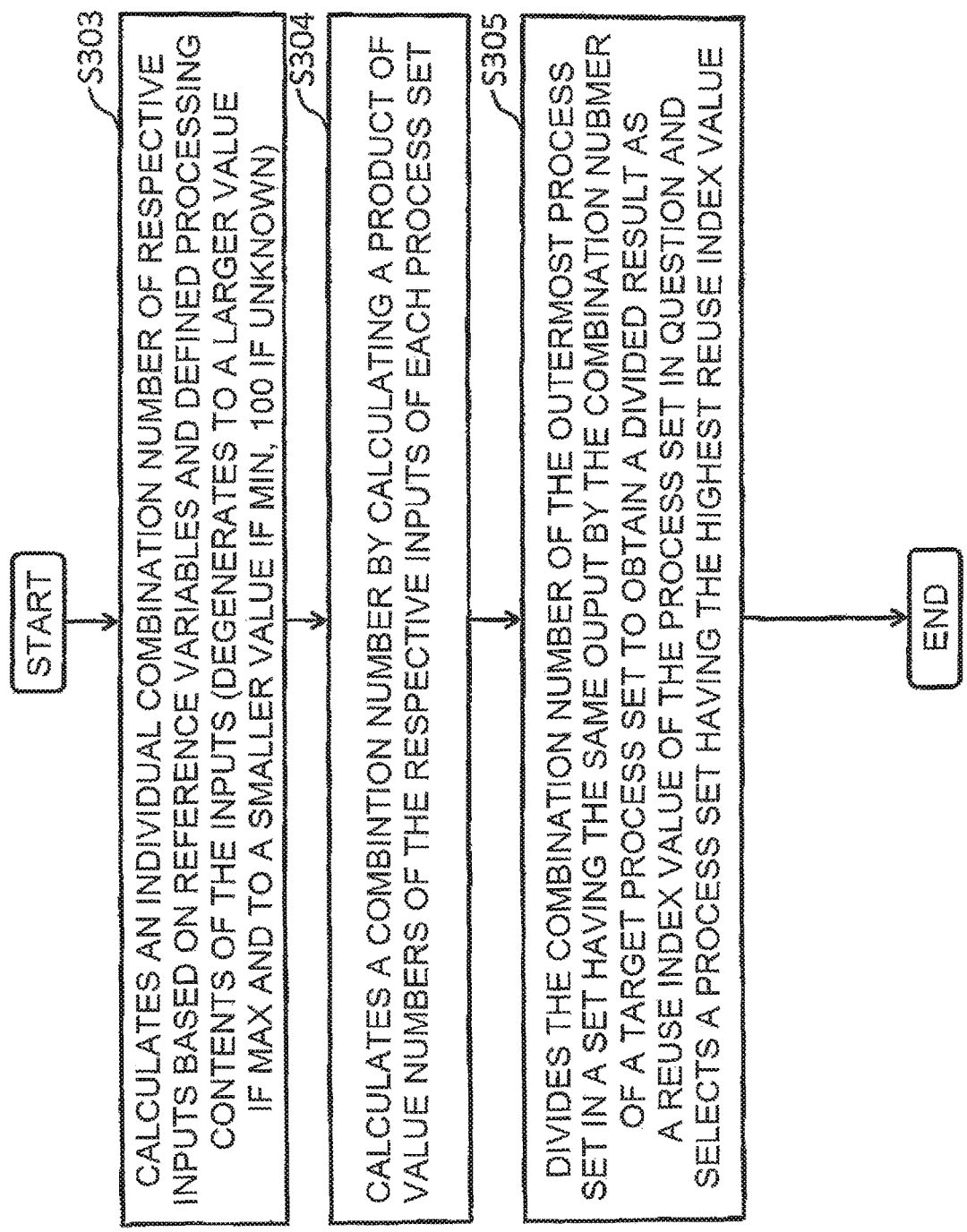
FIG. 17 is a flow chart for use in explaining an operation in a new process set selection determination unit illustrated in FIG. 9.

FIG. 17 is a flow chart for use in describing an operation of the new process set selection determination unit 302.

First of all, the new process set selection determination unit 302 calculates an individual combination number of respective inputs based on reference variables and defined processing contents of the inputs (step S303). Subsequently, the new process set selection determination unit 302 calculates a combination number by calculating a product of value numbers of the respective inputs of each process set (step S304).

Thereafter, the new process set selection determination unit 302 divides the combination number of the outermost process set in a set having the same output by the combination number of a target process set to obtain a divided result as a reuse index value of the process set in question, and selects a process set having the highest reuse index value (step S305). Thereafter, the new process set selection determination unit 302 ends the processing.

FIG. 18 is a view showing a method of calculating the combination number of the inputs for each of the process sets A, B, and C.

An input combination number is calculated based on a product of value numbers of the respective inputs. If the value number is unknown, any constant value is set. In this example, it is assumed that *d has a value number of 100.

[Description of Effect of Third Example Embodiment]

Next, an effect of the third example embodiment will be described.

According to the third example embodiment, it is possible to select, for the process sets, the process set which has the smallest combination number and high reusability.

Fourth Example Embodiment

Description will proceed to a fourth example embodiment of this invention.

[Description of Configuration]

A configuration of a data processing apparatus according to the fourth example embodiment is identical with that of the data processing apparatus 100A of the above-mentioned third example embodiment illustrated in FIG. 9.

In the data processing apparatus according to the fourth example embodiment, an operation of the new process set selection determination unit 302 of the data processing apparatus 100A according to the above-mentioned third example embodiment is different in the manner which will be described hereunder.

[Description of Operation]

Referring to a flow chart of FIG. 19, description will be made in detail about the operation of the new process set selection determination unit 302 of the data processing apparatus 100A according to the fourth example embodiment.

Figure 19:
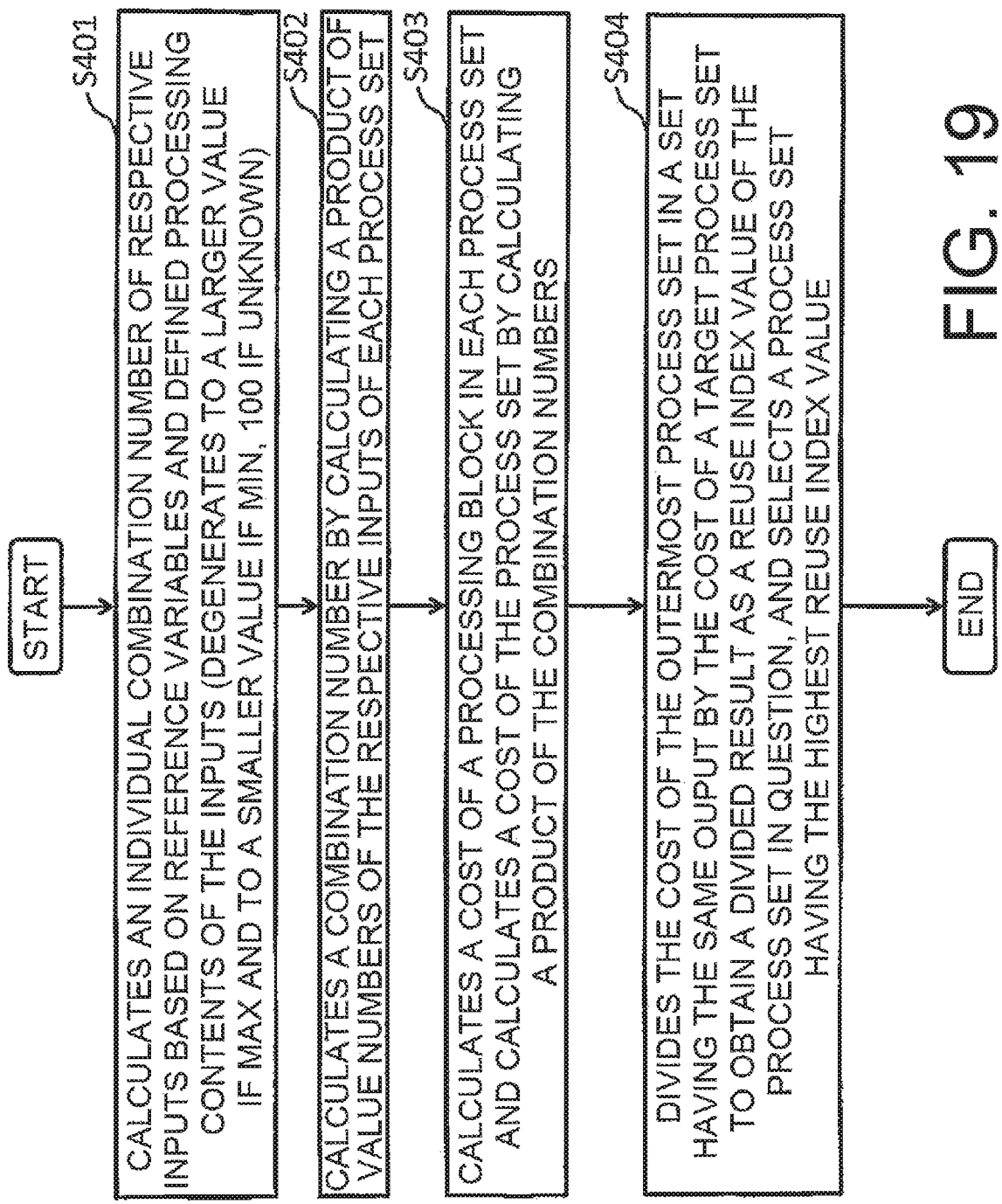
FIG. 19 is a flow chart for use in explaining an operation in a new process set selection determination unit according to a fourth example embodiment of this invention.

FIG. 19 is the flow chart for use in explaining the operation in the new process set selection determination unit 302 according to the fourth example embodiment.

First of all, the new process set selection determination unit 302 calculates individual combination numbers of respective inputs based on reference variables and defined processing contents of the inputs (step S401). Subsequently, the new process set selection determination unit 302 calculates a combination number by calculating a product of value numbers of the respective inputs of each process set (step S402).

Next, the new process set selection determination unit 302 calculates a cost of a processing block in each process set and calculates a cost of the process set by calculating a product of the above-mentioned combination numbers (step S403).

Thereafter, the new process set selection determination unit 302 divides the cost of the outermost process set in a set having the same output by the cost of a target process set to obtain a divided result as a reuse index value of the process set in question, and selects a process set having the highest reuse index value (step S404). Thereafter, the new process set selection determination unit 302 ends the processing.

Figure 20:
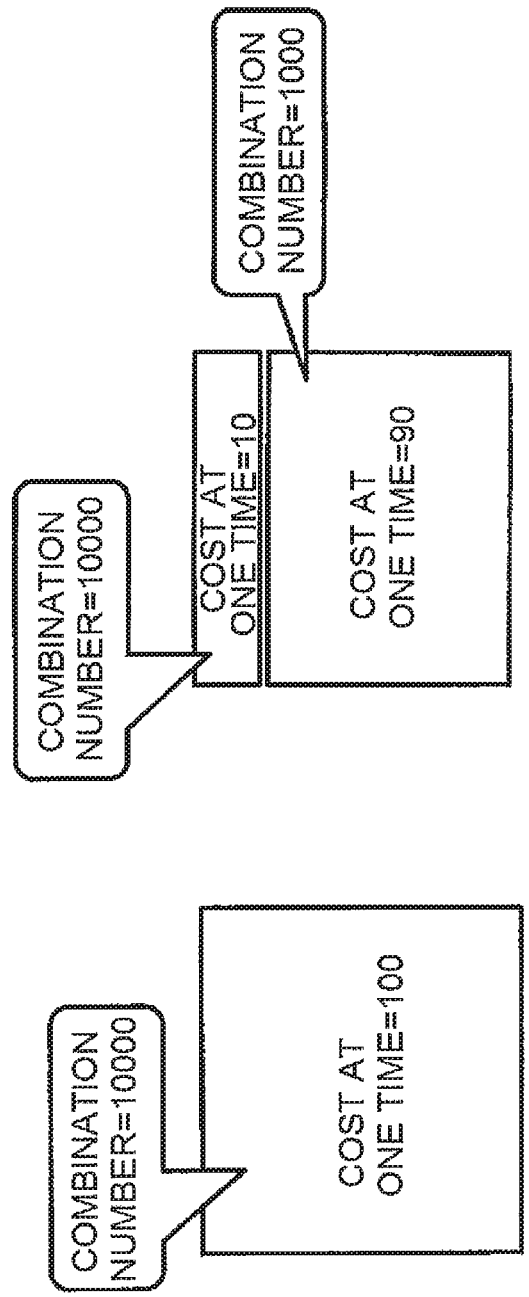
FIG. 20 is a view for illustrating an example of a selection method which considers a cost of the fourth example embodiment of this invention.

FIG. 20 is a view showing a selection method considering the cost of the fourth example embodiment. In FIG. 20, a left side shows an outermost process set while a right side shows a particular process set.

With respect to the cost of the process set on the left side, the processing block has the cost of 100 and the combination number is equal to 10000. Then, a total cost is equal to 1000000.

On the right side, with respect to a cost of an upper process set, the processing block has a cost of 10 and the combination number is equal to 10000. Then, the upper process set has a total cost of 100000. With respect to a cost of a lower process set, the processing block has a cost of 90 and the combination number is equal to 1000. Then, the lower process set has a total cost of 190000.

As the reuse index value of the process set on the right side, 5.2 is calculated from 1000000/190000.

In this example, only the process set on the left side and the process set on the right side are present, and the process set on the right side is selected.

[Description of Effect of Fourth Example Embodiment]

Next, an effect of the fourth example embodiment will be described.

According to the fourth example embodiment, it is possible to preferentially select a part which has high reusability and a high speed-up effect.

Fifth Example Embodiment

Description will proceed to a fifth example embodiment of this invention.

[Description of Configuration]

Figure 21:
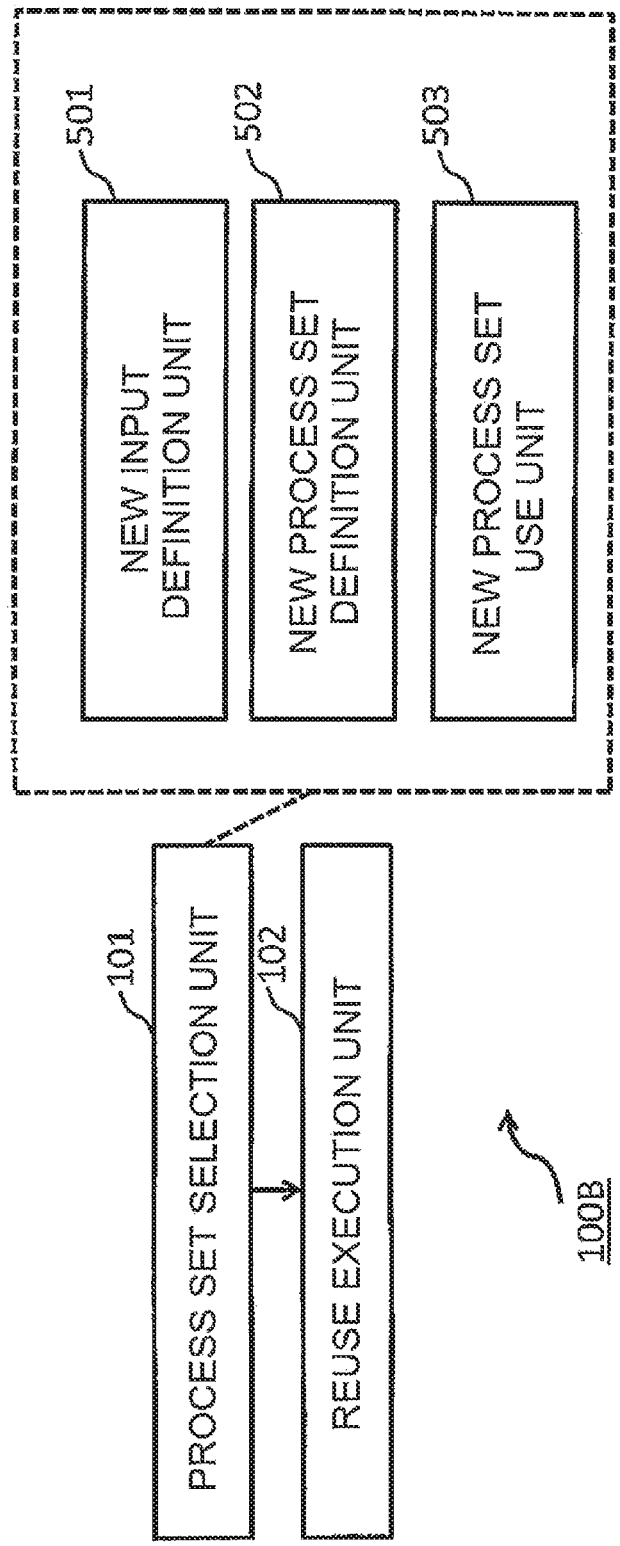
FIG. 21 is a block diagram for illustrating a configuration of the data processing apparatus according to a fifth example embodiment of this invention.

FIG. 21 is a block diagram for illustrating a configuration of a data processing apparatus 100B according to a fifth example embodiment of this invention. In the fifth example embodiment, the process set selection unit 101 in the data processing apparatus 100B comprises a new input definition unit 501, a new process set definition unit 502, and a new process set use unit 503.

[Description of Operation]

Figure 22:
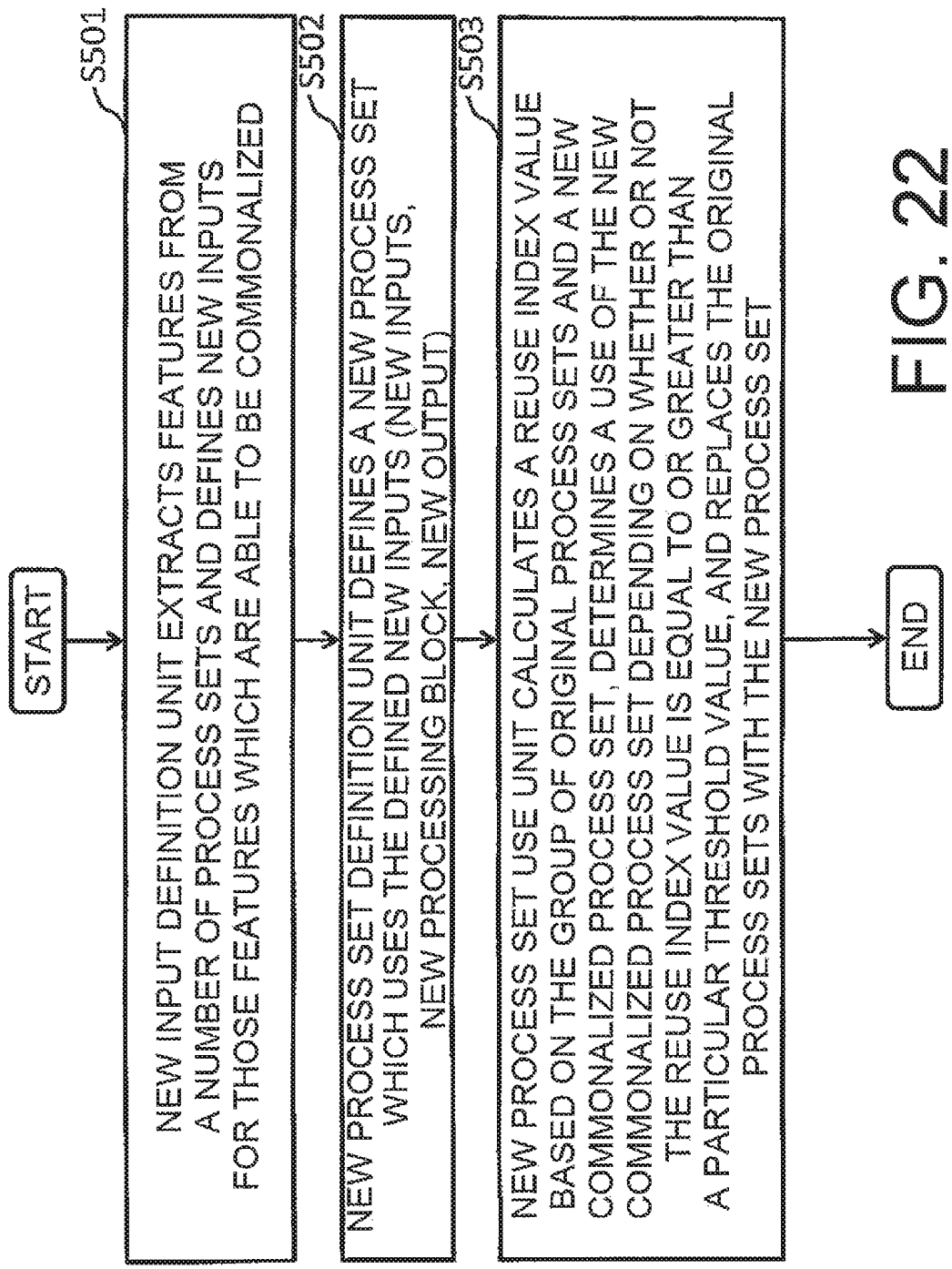
FIG. 22 is a flow chart for use in explaining an operation in a process set selection unit illustrated in FIG. 21.

FIG. 22 is a flow chart for use in explaining an operation in the process set selection unit 101 according to the fifth example embodiment.

First of all, the new input definition unit 501 extracts features from a number of process sets and defines new inputs for those features which are able to be commonalized (step S501).

Subsequently, the new process set definition unit 502 defines a new process set which uses the defined new inputs (step S502). Herein, the definition comprises new inputs, a new processing block, and a new output.

Next, the new process set use unit 503 calculates a reuse index value based on the group of original process sets and a new commonalized process set, determines a use of the new commonalized process set depending on whether or not the reuse index value is equal to or greater than a particular threshold value, and replaces the original process sets with the new process set (step S503). Thereafter, the new process set selection unit 101 ends the processing.

FIG. 23 is a view showing an example of a partial program as a target, which is executed by the data processing apparatus 100B according to the fifth example embodiment.

FIG. 24 is a view showing an example in which the new input definition unit 501 lists up features at the step S501.

Figure 25:
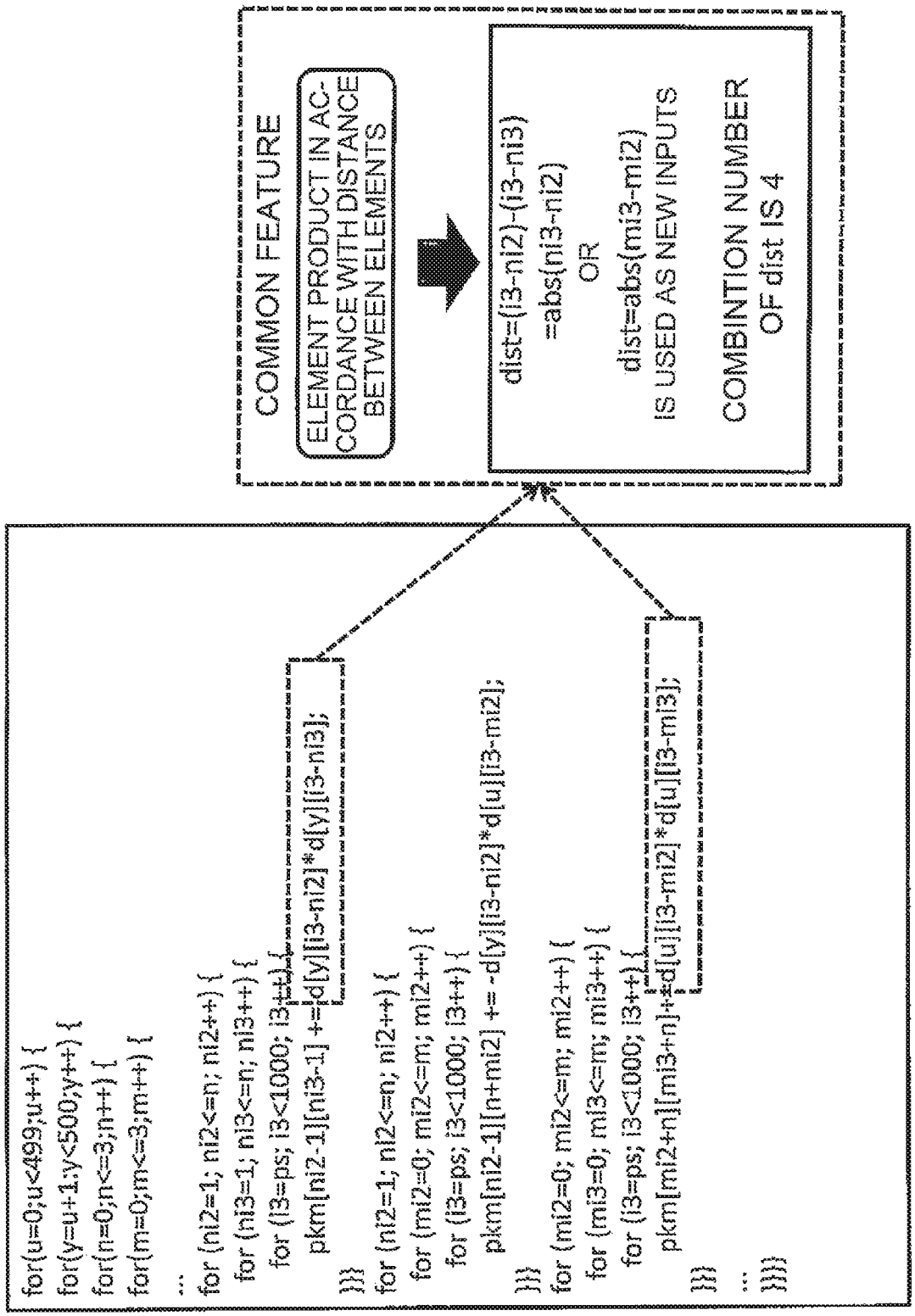
FIG. 25 is a view for illustrating an example in which the new input definition unit illustrated in FIG. 21 finds a commonalizable feature from the features at a step S501 in FIG. 22.

FIG. 25 is a view showing an example in which the new input definition unit 501 finds a commonalizable feature from the features at the step S501.

FIG. 26 is a view showing an example in which the new process set definition unit 502 generates a new process set based on the common feature at the step S502.

Figure 27:
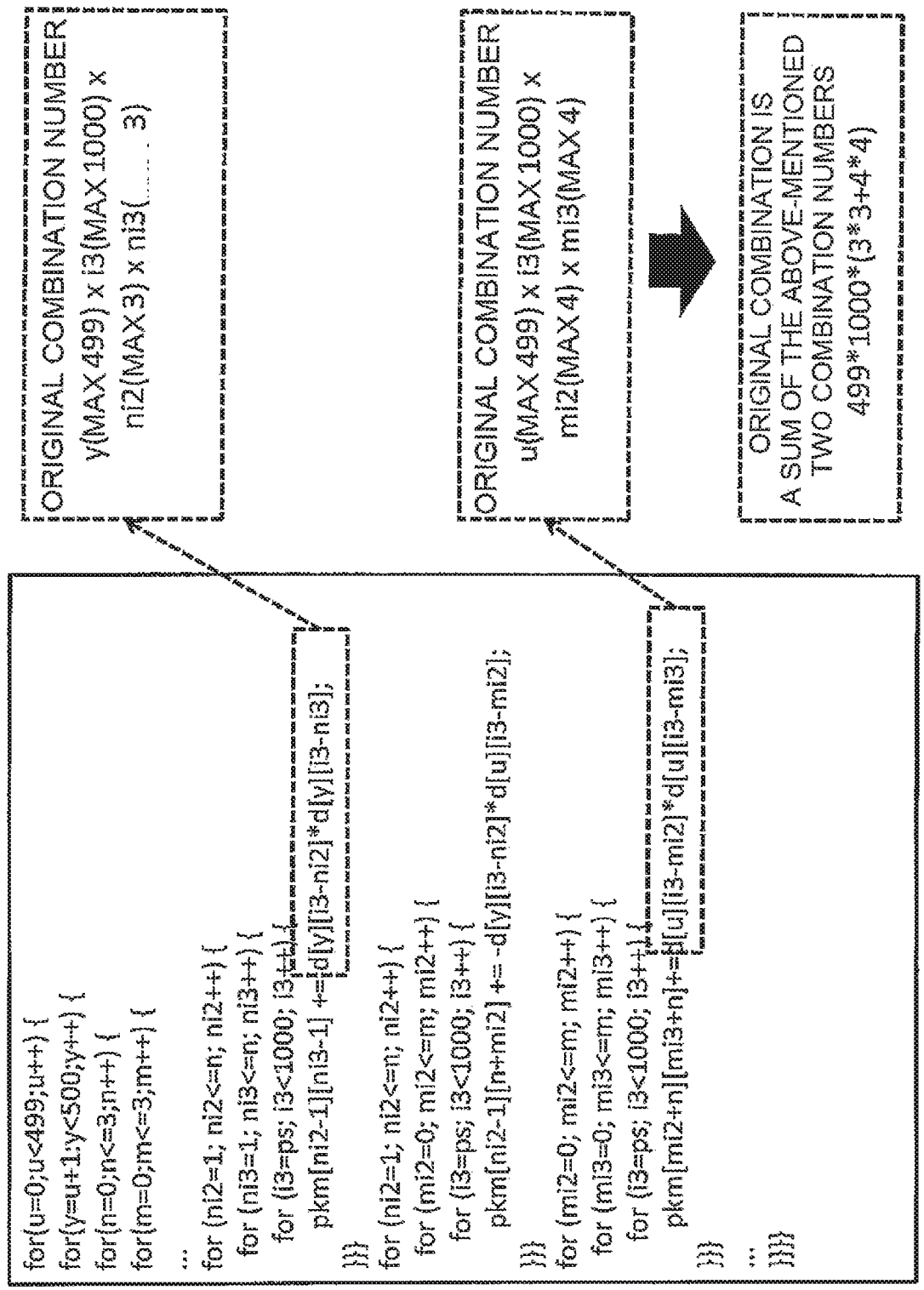
FIG. 27 is a view for illustrating a process in which a new process set use unit illustrated in FIG. 21 calculates a reuse evaluation value based on an original process set and the new process set at a step S503 in FIG. 22.
Figure 28:
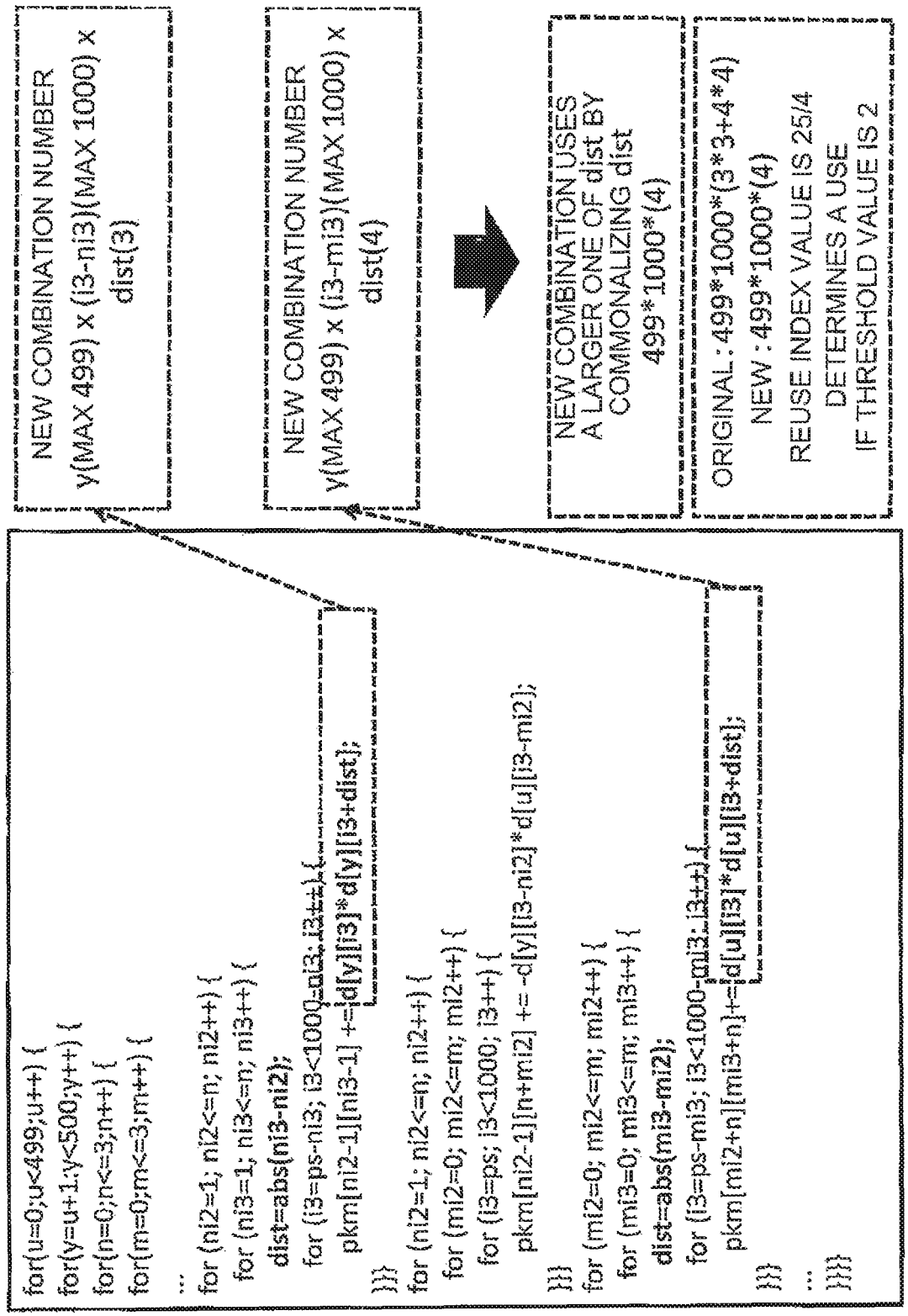
FIG. 28 is a view for illustrating another process in which the new process set use unit illustrated in FIG. 21 calculates the reuse evaluation value based on the original process set and the new process set at the step S503 in FIG. 22.

FIGS. 27 and 28 are views showing a process in which the new process set use unit 503 calculates a reuse evaluation value based on the original process sets and the new process set at the step S503.

FIG. 29 is a view showing an example of implementation in the reuse execution unit 102 in a case of pre-execution.

[Description of Effect of Fifth Example Embodiment]

Next, an effect of the fifth example embodiment will be described.

According to the fifth example embodiment, it is possible to perform the reuse in common among a large number of process sets.

[Description of Effect of Invention]

Next, an effect of this invention will be described.

According to this invention, a new group of inputs having a smaller combination number less than that of an original group of inputs is generated and an output of a new processing block is stored in association with the new group of inputs. Therefore, it is possible to enhance reusability by reusing an output with a combination number less than a combination number of possible values of the original group of inputs.

This invention is not strictly limited to the above-mentioned example embodiments, and may be embodied while the components are modified without departing from the gist thereof in a stage of implementation. Moreover, various inventions may be constructed by appropriately combining a plurality of components.

Respective parts of the data processing apparatus may be realized using a combination of hardware and software. In a form in which the hardware and the software are combined, respective parts are realized as various kinds of means by developing a data processing program in a RAM (random access memory) and making the hardware, such as a control unit (CPU (central processing unit)) or the like, operate based on the data processing program. The data processing program may be recorded in a recording medium to be distributed. The data processing program recorded in the recording medium is read into a memory via a wire, wirelessly, or via the recording medium itself to make the control unit and so on operate. By way of example, the recording medium may be an optical disk, a magnetic disk, a semiconductor memory device, a hard disk, or the like.

If the above-mentioned example embodiments are explained with different expressions, it is possible to realize the embodiments by making a computer to be operated as the data processing apparatus operate as the process set selection unit 101 and the reuse execution unit 102 according to the data processing program developed on the RAM.

A specific configuration of this invention is not limited to the foregoing example embodiments, and any change without departing from the gist of this invention is included in this invention.

While the present invention has been described with reference to the example embodiments thereof, the present invention is not limited to the foregoing example embodiments. The configuration and the details of this invention may be modified within the scope of this invention in various manners which could be understood by those of ordinary skill.

A part or a whole of the example embodiments disclosed above may also be described by, but are not limited to, the following supplementary notes.

(Supplementary Note 1)

A data processing apparatus comprising:

a process set selection unit configured to generate, based on a process set comprising a processing block configured to carry out arithmetic on a group of inputs and a group of outputs produced by the processing block, a group of new inputs having a combination number which is less than that of the group of inputs and a new processing block for the group of new inputs; and a reuse execution unit configured to prepare, based on the new processing block configured to perform arithmetic on the group of new inputs and a group of outputs produced by the new processing block, an associated result which associates the group of new inputs and the group of outputs, the reuse execution unit being configured to produce a group of outputs obtained from the associated result when the group of new inputs have values equal to those of the group of inputs, the reuse execution unit being configured to execute the new processing block to register an executed result to the associated result when the group of new inputs have values different from those of the group of inputs.

(Supplementary Note 2)

The data processing apparatus according to Supplementary Note 1, wherein the process set selection unit is configured to enumerate a number of process sets each comprising a group of inputs, a processing block, and an output, to group the process sets to be compared, to select, in each group, a process set having the maximum reuse index value, and to select a common process set which maximizes the reuse index value among the groups, wherein the reuse execution unit is configured to prepare, as an input/output table, outputs with respect to a combination of values in the group of new inputs, and to decide whether or not the input/output table includes those values all of which are same as the combination of values in the group of new inputs, the reuse execution unit being configured to derive from the input/output table the outputs with respect to the combination of the values in the group of new inputs to obtain an output of the new processing block when true is decided in the decision, and the reuse execution unit being configured to execute the new processing block to obtain an output and to register the combination of values in the group of new inputs and the output in the input/output table when false is decided in the decision.

(Supplementary Note 3)

The data processing apparatus according to Supplementary Note 1, wherein the process set selection unit is configured to enumerate a number of process sets each comprising a group of inputs, a processing block, and an output, to group the process sets to be compared, to select, in each group, a process set having the maximum reuse index value, and to select a common process set which maximizes the reuse index value among the groups, wherein the reuse execution unit is configured to pre-execute the new processing block for possible values of the group of new inputs before execution of a program, to save, in a storage area, a plurality of outputs as a result table by using as a key a combination of values in the group of new inputs, and to derive the output from the result table by using as a key the combination of values in the group of new inputs inside the new processing block.

(Supplementary Note 4)

The data processing apparatus according to Supplementary Note 2 or 3, wherein the process set selection unit comprises:

a process set enumeration unit configured to carry out a data flow analysis on the program and to enumerate, as a target process set, an edge to which one or more data flows analyzed are connected; and a new process set selection determination unit configured to calculate an individual combination number of respective inputs based on reference variables and defined processing contents of the inputs in question, to calculate a combination number by calculating a product of value numbers of the respective inputs of each process set, to divide the combination number of the outermost process set in a set having the same output by the combination number of a target process set to obtain a divided result as a reuse index value of the process set in question, and to select a process set having the highest reuse index value.

(Supplementary Note 5)

The data processing apparatus according to Supplementary Note 2 or 3, wherein the process set selection unit comprises:

a process set enumeration unit configured to carry out a data flow analysis on the program and to enumerate, as a target process set, an edge to which one or more data flows analyzed are connected; and a new process set selection determination unit configured to calculate an individual combination number of respective inputs based on reference variables and defined processing contents of the inputs in question, to calculate a combination number by calculating a product of value numbers of the respective inputs of each process set, to calculate a cost of a processing block in each process set, to calculate a cost of the process set by calculating a product of the combination numbers, to divide the cost of the outermost process set in a set having the same output by the cost of a target process set to obtain a divided result as a reuse index value for the process set in question, and to select a process set having the highest reuse index value.

(Supplementary Note 6)

The data processing apparatus according to Supplementary Note 2 or 3, wherein the process set selection unit comprises:

a new input definition unit configured to extract features from a number of process sets and to define new inputs for those features which are able to be commonalized;

a new process set definition unit configured to define a new process set which uses the defined new inputs; and a new process set use unit configured to calculate the reuse index value based on a group of original process sets and a new commonalized process set, to determine a use of the new commonalized process set depending on whether or not the reuse index value is equal to or greater than a particular threshold value, and to replace the original process sets with the new process set.

(Supplementary Note 7)

A data processing method comprising:

generating, in a process set selection unit, based on a process set comprising a processing block configured to carry out arithmetic on a group of inputs and a group of outputs produced by the processing block, a group of new inputs having a combination number which is less than that of the group of inputs and a new processing block for the group of new inputs; and preparing, in a reuse execution unit, based on the new processing block configured to perform arithmetic on the group of new inputs and a group of outputs produced by the new processing block, an associated result which associates the group of new inputs and the group of outputs, producing, in the reuse execution unit, a group of outputs obtained from the associated result when the group of new inputs have values equal to those of the group of inputs, and executing, in the reuse execution unit, the new processing block to register an executed result to the associated result when the group of new inputs have values different from those of the group of inputs.

(Supplementary Note 8)

The data processing method according to Supplementary Note 7, comprising:

enumerating, in the process set selection unit, a number of process sets each comprising a group of inputs, a processing block, and an output, grouping, in the process set selection unit, the process sets to be compared, selecting, in the process set selection unit, in each group, a process set having the maximum reuse index value, and selecting, in the process set selection unit, a common process set which maximizes the reuse index value among the groups, preparing, in the reuse execution unit, outputs with respect to a combination of values of the group of new inputs as an input/output table, deciding, in the reuse execution unit, whether or not the input/output table includes those values all of which are same as the combination of values in the group of new inputs, deriving, in the reuse execution unit, the outputs with respect to the combination of the values in the group of new inputs from the input/output table to obtain an output of the new processing block when true is decided in the decision, and executing, in the reuse execution unit, the new processing block to obtain an output and to register the combination of values in the group of new inputs and the output in the input/output table when false is decided in the decision.

(Supplementary Note 9)

The data processing method according to Supplementary Note 7, comprising:

enumerating, in the process set selection unit, a number of process sets each comprising a group of inputs, a processing block, and an output, grouping, in the process set selection unit, the process sets to be compared, selecting, in the process set selection unit, in each group, a process set having the maximum reuse index value, and selecting, in the process set selection unit, a common process set which maximizes the reuse index value among the groups, pre-executing, in the reuse execution unit, the new processing block for possible values of the group of new inputs before execution of a program, saving, in the reuse execution unit, in a storage area, a plurality of outputs as a result table by using as a key a combination of values in the group of new inputs, and deriving, in the reuse execution unit, the output from the result table by using as a key the combination of values in the group of new inputs inside the new processing block.

(Supplementary Note 10)

The data processing method according to Supplementary Note 8 or 9, wherein the process set selection unit is operable:

to carry out, in a process set enumeration unit, a data flow analysis on the program and to enumerate, as a target process set, an edge to which one or more data flows analyzed are connected; and to calculate, in a new process set selection determination unit, an individual combination number of respective inputs based on reference variables and defined processing contents of the inputs in question, calculate, in the new process set selection determination unit, a combination number by calculating a product of value numbers of the respective inputs of each process set, and divide, in the new process set selection determination unit, the combination number of the outermost process set in a set having the same output by the combination number of a target process set to obtain a divided result as a reuse index value of the process set in question, and select a process set having the highest reuse index value.

(Supplementary Note 11)

The data processing method according to Supplementary Note 8 or 9, wherein the process set selection unit is operable:

to carry out, in a process set enumeration unit, a data flow analysis on the program and to enumerate, as a target process set, an edge to which one or more data flows analyzed are connected; and to calculate, in a new process set selection determination unit, an individual combination number of respective inputs based on reference variables and defined processing contents of the inputs in question, calculate, in the new process set selection determination unit, a combination number by calculating a product of value numbers of the respective inputs of each process set, calculate, in the new process set selection determination unit, a cost of a processing block in each process set, calculate, in the new process set selection determination unit, a cost of the process set by calculating a product of the combination numbers, and divide, in the new process set selection determination unit, the cost of the outermost process set in a set having the same output by the cost of a target process set to obtain a divided result as a reuse index value for the process set in question, and to select a process set having the highest reuse index value.

(Supplementary Note 12)

The data processing method according to Supplementary Note 8 or 9, wherein the process set selection unit is operable:

to extract, in a new input definition unit, features from a number of process sets to define new inputs for those features which are able to be commonalized;

to define, in a new process set definition unit, a new process set which uses the defined new inputs; and to calculate, in a new process set use unit, the reuse index value based on a group of original process sets and a new commonalized process set, determine, in the new process set use unit, a use of the new commonalized process set depending on whether or not the reuse index value is equal to or greater than a particular threshold value, and replace, in the new process set use unit, the original process sets with the new process set.

(Supplementary Note 13)

A program recording medium for recording a data processing program for making a computer function as:

process set selection means for generating, based on a process set comprising a processing block configured to carry out arithmetic on a group of inputs and a group of outputs produced by the processing block, a group of new inputs having a combination number which is less than that of the group of inputs and a new processing block for the group of new inputs; and reuse execution means for preparing, based on the new processing block configured to perform arithmetic on the group of new inputs and a group of outputs produced by the new processing block, an associated result which associates the group of new inputs and the group of outputs, the reuse execution means being for producing a group of outputs obtained from the associated result when the group of new inputs have values equal to those of the group of inputs, the reuse execution means being for executing the new processing block to register an executed result to the associated result when the group of new inputs have values different from those of the group of inputs.

This application is based upon and claims the benefit of priority from Japanese patent application No. 2016-102285, filed on May 23, 2016, the disclosure of which is incorporated herein in its entirety by reference.

INDUSTRIAL APPLICABILITY

This invention is applicable to a use for speeding up an all correlation calculation processing program for searching for a correlation between any two sensor data among a large number of sensor data together with a combination of optimum parameters among a plurality of parameters.

EXPLANATION OF REFERENCE SIGNS 100, 100A, 100B data processing apparatus
101 process set selection unit
102 reuse execution unit
301 process set enumeration unit
302 new process set selection determination unit
501 new input definition unit
502 new process set definition unit
503 new process set use unit
3000 computer
3001 arithmetic processing unit
3002 storage unit

What is claimed is:

1. A data processing apparatus comprising a memory for storing a program and at least one processor, wherein the at least one processor executes the program stored in the memory to cause the data processing apparatus to operate as:
a process set selection unit configured to generate, based on a process set comprising a processing block configured to carry out arithmetic on a group of inputs and a group of outputs produced by the processing block, a group of new inputs having a combination number which is less than that of the group of inputs and a new processing block for the group of new inputs; and
a reuse execution unit configured to prepare, based on the new processing block configured to perform arithmetic on the group of new inputs and a group of outputs produced by the new processing block, an associated result which associates the group of new inputs and the group of outputs, the reuse execution unit being configured to produce a group of outputs obtained from the associated result when the group of new inputs have values equal to those of the group of inputs, the reuse execution unit being configured to execute the new processing block to register an executed result to the associated result when the group of new inputs have values different from those of the group of inputs,
wherein the process set selection unit is configured to enumerate a number of process sets each comprising a group of inputs, a processing block, and an output, to group the process sets to be compared, to select, in each group, a process set having the maximum reuse index value, and to select a common process set which maximizes the reuse index value among the groups.

2. The data processing apparatus as claimed in claim 1, wherein the reuse execution unit is configured to prepare, as an input/output table, outputs with respect to a combination of values in the group of new inputs, and to decide whether or not the input/output table includes those values all of which are same as the combination of values in the group of new inputs, the reuse execution unit being configured to derive from the input/output table the outputs with respect to the combination of the values in the group of new inputs to obtain an output of the new processing block when true is decided in the decision, and the reuse execution unit being configured to execute the new processing block to obtain an output and to register the combination of values in the group of new inputs and the output in the input/output table when false is decided in the decision.

3. The data processing apparatus as claimed in claim 1, wherein the reuse execution unit is configured to pre-execute the new processing block for possible values of the group of new inputs before execution of a program, to save, in a storage area, a plurality of outputs as a result table by using as a key a combination of values in the group of new inputs, and to derive the output from the result table by using as a key the combination of values in the group of new inputs inside the new processing block.

4. The data processing apparatus as claimed in claim 1, wherein the process set selection unit comprises:
a process set enumeration unit configured to carry out a data flow analysis on the program and to enumerate, as a target process set, an edge to which one or more data flows analyzed are connected; and
a new process set selection determination unit configured to calculate an individual combination number of respective inputs based on reference variables and defined processing contents of the inputs in question, to calculate a combination number by calculating a product of value numbers of the respective inputs of each process set, to divide the combination number of the outermost process set in a set having the same output by the combination number of a target process set to obtain a divided result as a reuse index value of the process set in question, and to select a process set having the highest reuse index value.

5. The data processing apparatus as claimed in claim 1, wherein the process set selection unit comprises:
a process set enumeration unit configured to carry out a data flow analysis on the program and to enumerate, as a target process set, an edge to which one or more data flows analyzed are connected; and
a new process set selection determination unit configured to calculate an individual combination number of respective inputs based on reference variables and defined processing contents of the inputs in question, to calculate a combination number by calculating a product of value numbers of the respective inputs of each process set, to calculate a cost of a processing block in each process set, to calculate a cost of the process set by calculating a product of the combination numbers, to divide the cost of the outermost process set in a set having the same output by the cost of a target process set to obtain a divided result as a reuse index value for the process set in question, and to select a process set having the highest reuse index value.

6. The data processing apparatus as claimed in claim 1, wherein the process set selection unit comprises:
a new input definition unit configured to extract features from a number of process sets and to define new inputs for those features which are able to be commonalized;
a new process set definition unit configured to define a new process set which uses the defined new inputs; and
a new process set use unit configured to calculate the reuse index value based on a group of original process sets and a new commonalized process set, to determine a use of the new commonalized process set depending on whether or not the reuse index value is equal to or greater than a particular threshold value, and to replace the original process sets with the new process set.

7. A data processing method comprising:
generating, in a process set selection unit, based on a process set comprising a processing block configured to carry out arithmetic on a group of inputs and a group of outputs produced by the processing block, a group of new inputs having a combination number which is less than that of the group of inputs and a new processing block for the group of new inputs; and
preparing, in a reuse execution unit, based on the new processing block configured to perform arithmetic on the group of new inputs and a group of outputs produced by the new processing block, an associated result which associates the group of new inputs and the group of outputs, producing, in the reuse execution unit, a group of outputs obtained from the associated result when the group of new inputs have values equal to those of the group of inputs, and executing, in the reuse execution unit, the new processing block to register an executed result to the associated result when the group of new inputs have values different from those of the group of inputs,
wherein the method further comprises:
enumerating, in the process set selection unit, a number of process sets each comprising a group of inputs, a processing block, and an output, grouping, in the process set selection unit, the process sets to be compared, selecting, in the process set selection unit, in each group, a process set having the maximum reuse index value, and selecting, in the process set selection unit, a common process set which maximizes the reuse index value among the groups.

8. The data processing method as claimed in claim 7, comprising:
preparing, in the reuse execution unit, outputs with respect to a combination of values of the group of new inputs as an input/output table, deciding, in the reuse execution unit, whether or not the input/output table includes those values all of which are same as the combination of values in the group of new inputs, deriving, in the reuse execution unit, the outputs with respect to the combination of the values in the group of new inputs from the input/output table to obtain an output of the new processing block when true is decided in the decision, and executing, in the reuse execution unit, the new processing block to obtain an output and to register the combination of values in the group of new inputs and the output in the input/output table when false is decided in the decision.

9. The data processing method as claimed in claim 7, comprising:
pre-executing, in the reuse execution unit, the new processing block for possible values of the group of new inputs before execution of a program, saving, in the reuse execution unit, in a storage area, a plurality of outputs as a result table by using as a key a combination of values in the group of new inputs, and deriving, in the reuse execution unit, the output from the result table by using as a key the combination of values in the group of new inputs inside the new processing block.

10. The data processing method as claimed in claim 7, wherein the process set selection unit is operable:
to carry out, in a process set enumeration unit, a data flow analysis on the program and to enumerate, as a target process set, an edge to which one or more data flows analyzed are connected; and
to calculate, in a new process set selection determination unit, an individual combination number of respective inputs based on reference variables and defined processing contents of the inputs in question, calculate, in the new process set selection determination unit, a combination number by calculating a product of value numbers of the respective inputs of each process set, and divide, in the new process set selection determination unit, the combination number of the outermost process set in a set having the same output by the combination number of a target process set to obtain a divided result as a reuse index value of the process set in question, and select a process set having the highest reuse index value.

11. The data processing method as claimed in claim 7, wherein the process set selection unit is operable:
to carry out, in a process set enumeration unit, a data flow analysis on the program and to enumerate, as a target process set, an edge to which one or more data flows analyzed are connected; and
to calculate, in a new process set selection determination unit, an individual combination number of respective inputs based on reference variables and defined processing contents of the inputs in question, calculate, in the new process set selection determination unit, a combination number by calculating a product of value numbers of the respective inputs of each process set, calculate, in the new process set selection determination unit, a cost of a processing block in each process set, calculate, in the new process set selection determination unit, a cost of the process set by calculating a product of the combination numbers, and divide, in the new process set selection determination unit, the cost of the outermost process set in a set having the same output by the cost of a target process set to obtain a divided result as a reuse index value for the process set in question, and to select a process set having the highest reuse index value.

12. The data processing method as claimed in claim 7, wherein the process set selection unit is operable:
to extract, in a new input definition unit, features from a number of process sets to define new inputs for those features which are able to be commonalized;
to define, in a new process set definition unit, a new process set which uses the defined new inputs; and
to calculate, in a new process set use unit, the reuse index value based on a group of original process sets and a new commonalized process set, determine, in the new process set use unit, a use of the new commonalized process set depending on whether or not the reuse index value is equal to or greater than a particular threshold value, and replace, in the new process set use unit, the original process sets with the new process set.

13. A non-transitory computer readable recording medium for recording a data processing program for causing a computer to operate as:
process set selection means for generating, based on a process set comprising a processing block configured to carry out arithmetic on a group of inputs and a group of outputs produced by the processing block, a group of new inputs having a combination number which is less than that of the group of inputs and a new processing block for the group of new inputs; and
reuse execution means for preparing, based on the new processing block configured to perform arithmetic on the group of new inputs and a group of outputs produced by the new processing block, an associated result which associates the group of new inputs and the group of outputs, the reuse execution means being for producing a group of outputs obtained from the associated result when the group of new inputs have values equal to those of the group of inputs, the reuse execution means being for executing the new processing block to register an executed result to the associated result when the group of new inputs have values different from those of the group of inputs, wherein the process set selection means is configured to enumerate a number of process sets each comprising a group of inputs, a processing block, and an output, to group the process sets to be compared, to select, in each group, a process set having the maximum reuse index value, and to select a common process set which maximizes the reuse index value among the groups.

* * * * *